(12) United States Patent
Hayashi et al.

(10) Patent No.: US 9,493,600 B2
(45) Date of Patent: *Nov. 15, 2016

(54) POLYMER, SURFACE HYDROPHILIZING AGENT CONTAINING SAID POLYMER, AND MANUFACTURING METHOD FOR SUBSTRATE HAVING HYDROPHILIC SURFACE

(75) Inventors: Naoki Hayashi, Minato-ku (JP); Toshihiro Ogawa, Minato-ku (JP); Shin-ichirou Iwanaga, Minato-ku (JP); Kazuhiro Iso, Minato-ku (JP)

(73) Assignee: JSR CORPORATION, Tokyo (JP)

( * ) Notice: Subject to any disclaimer, the term of this patent is extended or adjusted under 35 U.S.C. 154(b) by 110 days.

This patent is subject to a terminal disclaimer.

(21) Appl. No.: 14/238,073

(22) PCT Filed: Aug. 10, 2012

(86) PCT No.: PCT/JP2012/070438
§ 371 (c)(1),
(2), (4) Date: Feb. 10, 2014

(87) PCT Pub. No.: WO2013/022085
PCT Pub. Date: Feb. 14, 2013

(65) Prior Publication Data
US 2014/0194557 A1    Jul. 10, 2014

(30) Foreign Application Priority Data
Aug. 10, 2011 (JP) .................. 2011-175148

(51) Int. Cl.
| | | |
|---|---|---|
| B05D 5/04 | (2006.01) |
| C09D 125/04 | (2006.01) |
| C09D 133/08 | (2006.01) |
| C09D 133/12 | (2006.01) |
| C09D 133/26 | (2006.01) |
| C09D 5/00 | (2006.01) |
| C08F 12/08 | (2006.01) |
| C08F 18/10 | (2006.01) |
| C08F 18/22 | (2006.01) |
| C08F 20/56 | (2006.01) |
| C08F 8/34 | (2006.01) |
| C08F 267/06 | (2006.01) |
| C08F 212/08 | (2006.01) |
| C08F 8/06 | (2006.01) |
| C08F 220/38 | (2006.01) |
| C08F 22/02 | (2006.01) |
| C08F 24/00 | (2006.01) |
| C08F 28/02 | (2006.01) |
| C09D 133/02 | (2006.01) |
| C09D 137/00 | (2006.01) |
| C09D 141/00 | (2006.01) |
| C09D 151/00 | (2006.01) |
| C08F 293/00 | (2006.01) |

(52) U.S. Cl.
CPC .............. *C08F 267/06* (2013.01); *C08F 8/06* (2013.01); *C08F 8/34* (2013.01); *C08F 22/02* (2013.01); *C08F 24/00* (2013.01); *C08F 28/02* (2013.01); *C08F 212/08* (2013.01); *C08F 220/38* (2013.01); *C09D 133/02* (2013.01); *C09D 137/00* (2013.01); *C09D 141/00* (2013.01); *C09D 151/003* (2013.01); *C08F 293/005* (2013.01); *C08F 2438/03* (2013.01)

(58) Field of Classification Search
None
See application file for complete search history.

(56) References Cited

U.S. PATENT DOCUMENTS

| | | | |
|---|---|---|---|
| 3,337,458 A | 8/1967 | Bauer | |
| 3,857,823 A | 12/1974 | Ackermann | |
| 3,917,697 A | 11/1975 | Farber | |
| 4,095,029 A * | 6/1978 | Fields | A01N 41/10 252/395 |
| 4,707,516 A * | 11/1987 | Janouch | C08F 8/34 525/60 |
| 5,316,862 A * | 5/1994 | Yamamoto | G11B 5/7023 428/522 |
| 2002/0029848 A1 | 3/2002 | Ando et al. | |
| 2006/0079431 A1* | 4/2006 | Lal | A01N 25/30 510/421 |
| 2009/0124707 A1 | 5/2009 | Tamori et al. | |
| 2015/0017221 A1* | 1/2015 | Hayashi | C08F 220/32 424/423 |

FOREIGN PATENT DOCUMENTS

| | | |
|---|---|---|
| CN | 101430333 A | 5/2009 |
| DE | 2 031 136 | 12/1971 |
| DE | 24 34 550 | 2/1975 |
| EP | 1 908 788 A1 | 4/2008 |
| JP | 10 153599 | 6/1998 |
| JP | 11 352127 | 12/1999 |
| JP | 2000 119246 | 4/2000 |
| JP | 2002 69261 | 3/2002 |
| JP | 3443891 | 9/2003 |
| JP | 2007 119696 | 5/2007 |
| JP | 2007 126681 | 5/2007 |
| KR | 10-2006-0106820 A | 10/2006 |

OTHER PUBLICATIONS

Machine translation of DE 2434550 A1 (no date).*
Combined Chinese Office Action and Search Report issued Apr. 28, 2015 in Patent Application No. 201280038597.8 (withEnglish Translation of Category of Cited Documents).

(Continued)

Primary Examiner — Michael J Feely
(74) Attorney, Agent, or Firm — Oblon, McClelland, Maier & Neustadt, L.L.P.

(57) ABSTRACT

To provide a novel polymer having an excellent non-specific adsorption inhibitory effect, a surface-hydrophilizing agent comprising the polymer, and a method for producing a substrate having a hydrophilic surface.

The polymer comprises a hydrophilic repeating unit having a sulfinyl group in a side chain thereof.

12 Claims, No Drawings

(56) References Cited

OTHER PUBLICATIONS

Li Deng et al., "Self-Assembled Monolayers of Alkanethiolates Presenting Tri(propylene sulfoxide) Groups Resist the Adsorption of Protein", J. Am. Chem. Soc., vol. 118, No. 21, May 29, 1996, pp. 5136-5137.
Tsutomu Ohashi et al., "Syntheses of Poly-(2-Methylsulfinyl-ethyl) methacrylate and Poly-(2-Methylsulfonyl-ethyl) methacrylate", Kobunshi Kagaku (High Polymer Chemistry), vol. 24, No. 264, Apr. 25, 1967, pp. 334-336 (with English abstract).
Li Yu-Liang et al., "Research on Polymer-Supported Rare Earth Metal Complexes", Acta Chimica Sinica, vol. 45, No. 8, Aug. 31, 1987, pp. 801-804, (with Partial English Translation).
Japanese Office Acton issued Oct. 7, 2014 in Patent Application No. 2013-528076 (with English Translation).
Extended European Search Report issued Feb. 12, 2015 in Patent Application No. 12821903.7.
Kondo, S., et al., "Polymeric Sulfoxides: Effective Catalysts in Two Phase Reactions", Makromol. Chem., Rapid Commun., vol. 4, pp. 145-148, (1983).
Written Opinion of the International Searching Authority Issued Nov. 27, 2012 in PCT/JP12/070438 Filed Aug. 10, 2012.
International Search Report Issued Nov. 27, 2012 in PCT/JP12/070438 Filed Aug. 10, 2012.
Office Action issued May 19, 2015 in Japanese Patent Application No. 2013-528076 (with English language translation).
Vladimir Cirkva, et al., "New perfluoroalkylated amphiphilic methacrylates bearing sulfinyl group as monomers for biomedical applications: water content and oxygen permeability of their copolymers with DEGMA" European Journal of Medicinal Chemistry, vol. 41, No. 11, 2006, pp. 1320-1326 (English Abstract only).
Office Action issued Jan. 21, 2016 in Korean Patent Application No. 10-2014-7002980.
Combined Office Action and Search Report issued on Dec. 24, 2015 in Chinese Patent Application No. 201280038597.8 with English translation of category of cited documents.

\* cited by examiner

POLYMER, SURFACE HYDROPHILIZING AGENT CONTAINING SAID POLYMER, AND MANUFACTURING METHOD FOR SUBSTRATE HAVING HYDROPHILIC SURFACE

TECHNICAL FIELD

The present invention relates to a novel polymer, to a surface-hydrophilizing agent containing the polymer, and a method for producing a substrate having a hydrophilic surface.

BACKGROUND ART

Bio-substance assay methods employing a solid phase such as a polystyrene plate or magnetic particles onto which a target substance is to be adsorbed are widely employed in clinical tests, diagnostic agents, and the like. Generally, such a bio-substance is detected through enzymatic coloration or fluorescence or chemical luminescence. In either detection method, biomolecules present in a serum sample, secondary antibody, protein and lipid contained in a coloration substrate, and other related substances are adsorbed non-specifically onto a solid phase, a container, an instrument, or the like, and the adsorbed substances cause noise in the assay, thereby problematically impairing the sensitivity of the assay.

In one mode for solving the problem, the surface of a solid phase, a container, an instrument, or the like is treated with a bio-origin substance such as albumin, casein, or gelatin, in order to prevent non-specific adsorption of protein, lipid, and the like.

However, the aforementioned bio-origin substance exhibits insufficient non-specific adsorption inhibitory effect, and a bio-contamination-related problem such as BSE may occur.

Thus, there is demand for development of a chemically synthesized surface-hydrophilizing agent. Hitherto, there have been proposed, as the surface-hydrophilizing agent, a specific polymer having a polyoxyethylene chain (Patent Documents 1 and 2) and a specific methacrylic copolymer (Patent Document 3).

CITATION LIST

Patent Documents

Patent Document 1: JP-A-H10-153599
Patent Document 2: JP-A-H11-352127
Patent Document 3: Japanese Patent No. 3443891

SUMMARY OF THE INVENTION

Problems to be Solved by the Invention

An object of the present invention is to provide a novel polymer having an excellent non-specific adsorption inhibitory effect, a surface-hydrophilizing agent containing the polymer, and a method for producing a substrate having hydrophilic surface.

Means for Solving the Problems

The present inventors conducted extensive studies in order to attain the aforementioned objects, and found that a polymer including a hydrophilic repeating unit having sulfinyl group in a side chain thereof exhibits an excellent non-specific adsorption inhibitory effect. The present invention has been accomplished on the basis of this finding.

Accordingly, the present invention provides a polymer including a hydrophilic repeating unit having a sulfinyl group in a side chain thereof.

The present invention also provides a surface-hydrophilizing agent containing the aforementioned polymer.

The present invention also further provides a method for producing a substrate having a hydrophilic surface, characterized in that the method comprises a step of bringing a substrate into contact with the aforementioned surface-hydrophilizing agent.

Effects of the Invention

The polymer of the present invention exhibits an excellent non-specific adsorption inhibitory effect. Therefore, the present invention enables provision of a surface-hydrophilizing agent providing a non-specific adsorption inhibitory effect.

MODES FOR CARRYING OUT THE INVENTION

The polymer of the present invention includes a hydrophilic repeating unit having at least one sulfinyl group in a side chain thereof (hereinafter may be referred to as repeating unit (A)). Such a polymer will next be described in detail.

The repeating unit (A) is hydrophilic. As used herein, the term "hydrophilic" refers to having strong affinity to water. In a specific case, when a homopolymer (i.e., inducing a single type repeating unit) (having a number average molecular weight of about 10,000 to about 100,000, as determined through the method disclosed in the Examples) is dissolved in an amount of 1 g or more in pure water (100 g) at ambient temperature (25° C.), the repeating unit is evaluated as being hydrophilic.

The repeating unit (A) preferably has a hydrophile-lipophile balance (HLB) of 10 or higher, the HLB being an index of the hydrophilicity or hydrophobicity scale. In order to attain high hydrophilicity, the HLB is preferably 15 or higher, more preferably 20 to 40.

As used herein, the HLB is a value calculated from the ratio of organic factor of a compound to inorganic factor of the same (Oda's equation), and may be calculated through a method disclosed in "Formulation Design with Organic Conception Diagram," 1998, NIHON EMULSION CO., LTD. For example, the hydrophilic repeating unit of copolymer N-1-1 described in the below-given Examples has an HLB of $(100 \times 4 + 60 \times 1 + 20 \times 2 + 140)/(40 - 10 \times 4 + 20 \times 15) \times 10 = 21.3$.

No particular limitation is imposed on the repeating unit (A), but a nonionic repeating unit is preferred.

In addition to a sulfinyl group, the repeating unit (A) may further have a hydrophilic group such as hydroxy, carboxy, amino, sulfo, thiol, phosphate, or aldehyde. The positions and the number of such hydrophilic groups are selected without any limitation. However, the hydrophilic group is preferably attached to a side chain of the polymer. From the viewpoint of attaining moderate hydrophilicity, the number of hydrophilic groups other than the sulfinyl group is preferably 0 to 12 in one repeating unit, more preferably 0 to 10, even more preferably 0 to 5, even more preferably 0 to 3, further more preferably 1 to 3, particularly preferably 2 or 3. From the viewpoint of attaining moderate hydrophilicity, among the aforementioned hydrophilic groups, a hydroxy group is preferred. Notably, so long as the effects of the present invention are not impaired, a part of sulfinyl groups present in the polymer may be converted to a sulfide group or a sulfonyl group.

Preferred example of the repeating unit (A) is a repeating unit having, in a side chain thereof, at least one moiety represented by the following formula (1):

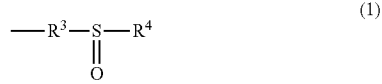

(wherein $R^3$ represents a direct bond or a C1 to C24 divalent organic group; and $R^4$ represents a C1 to C10 organic group). Known polymers including a repeating unit having a structure represented by formula (1) in a side chain thereof may be used. Among such polymers, (meth)acrylate polymers, (meth)acrylamide polymers, styrene polymers, and similar polymers are preferred. A more specific example is a repeating unit represented by the following formula (2):

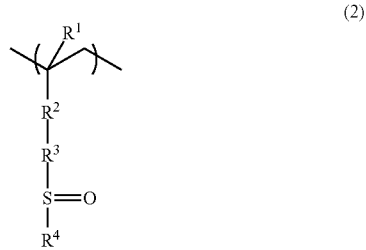

(wherein $R^1$ represents a hydrogen atom or a methyl group; $R^2$ represents —O—, *—(C=O)—O—, *—(C=O)—NR$^5$—, *—NR$^5$—(C=O)— ($R^5$ represents a hydrogen atom or a C1 to C10 organic group; and * denotes the position of bonding to the carbon atom to which $R^1$ is bonded in formula (2)), or a phenylene group; and $R^3$ and $R^4$ have the same meanings as defined above).

Hereinafter, the symbols used in formulas (1) and (2) will be described in detail.

$R^1$ represents a hydrogen atom or a methyl group, with a methyl group being preferred.

$R^2$ represents —O—, *—(C=O)—O—, *—(C=O)—NR$^5$—, *—NR$^5$—(C=O)—, or a phenylene group. Examples of the phenylene group include 1,2-phenylene, 1,3-phenylene, and 1,4-phenylene.

The organic group represented by $R^5$ preferably includes 1 to 10 carbon atoms, more preferably 2 to 8 carbon atoms, even more preferably 2 to 6 carbon atoms. Examples of the organic group include a hydrocarbyl group. The hydrocarbyl group conceptually encompasses an aliphatic hydrocarbyl group, an alicyclic hydrocarbyl group, and an aromatic hydrocarbyl group.

The aliphatic hydrocarbyl group of $R^5$ may be a linear chain or a branched chain. Specific examples include alkyl groups such as methyl, ethyl, n-propyl, isopropyl, n-butyl, isobutyl, sec-butyl, tert-butyl, pentyl, hexyl, heptyl, and octyl.

The alicyclic hydrocarbyl group is divided into a monocyclic alicyclic hydrocarbyl group and a bridged cycle hydrocarbyl group. Examples of the monocyclic alicyclic hydrocarbyl group include cycloalkyl groups such as cyclopropyl and cyclohexyl. Examples of the bridged cycle hydrocarbyl group include isobornyl.

Examples of the aromatic hydrocarbyl group include aryl groups such as phenyl.

Among the aforementioned groups of $R^2$, *—(C=O)—O— and phenylene are preferred, with *—(C=O)—O— being particularly preferred, from the viewpoint of prevention of non-specific adsorption.

$R^3$ represents a direct bond or a C1 to C24 divalent organic group. Examples of the direct bond include a single bond.

Among the bonds and groups of $R^3$, a C1 to C24 divalent organic group is preferred. The divalent organic group preferably has 2 to 18 carbon atoms, more preferably 2 to 10 carbon atoms, even more preferably 2 to 9 carbon atoms, particularly preferably 3 to 6 carbon atoms.

Examples of the divalent organic group include a divalent hydrocarbyl group. The divalent hydrocarbyl group is preferably a divalent aliphatic hydrocarbyl group and may be a linear chain or a branched chain. Specific examples include alkanediyl groups such as methane-1,1-diyl, ethane-1,1-diyl, ethane-1,2-diyl, propane-1,1-diyl, propane-1,2-diyl, propane-1,3-diyl, propane-2,2-diyl, butane-1,2-diyl, butane-1,3-diyl, butane-1,4-diyl, pentane-1,4-diyl, pentane-1,5-diyl, hexane-1,5-diyl, hexane-1,6-diyl, heptane-1,7-diyl, and octane-1,8-diyl.

The divalent hydrocarbyl group may have a substituent and may include an ether bond between a carbon-carbon bond.

Examples of the substituent which may have the divalent hydrocarbyl group include the aforementioned hydrophilic groups. The number of the substituent or substituents is preferably 1 to 5, more preferably 1 to 3, even more preferably 1 or 2.

The number of the ether bond or ether bonds which the divalent hydrocarbyl group may include is preferably 0 to 5, more preferably 0 to 3.

Preferred example of the divalent organic groups is a linkage group represented by the following formula (3) or a C1 to C24 alkanediyl group, preferably a linkage group represented by the following formula (3):

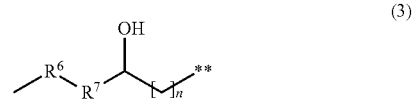

and
(wherein $R^6$ represents a single bond, —$R^8$—O— ($R^8$ represents a C1 to C4 alkanediyl group)), or a linkage group represented by the following formula (4):

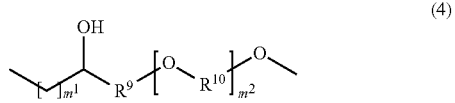

(wherein $R^9$ represents a C1 to C4 alkanediyl group; $R^{10}$ represents a C2 or C3 alkanediyl group; $m^1$ is 1 or 2; and $m^2$ is an integer of 1 to 3); $R^7$ represents a C1 to C4 alkanediyl group; n is 1 or 2; and ** denotes the position of bonding to the sulfur atom in formulas (1) and (2)).

The $R^6$ is preferably a single bond or particularly preferably a single bond.

The alkanediyl groups represented by $R^7$, $R^8$, and $R^9$ each have 1 to 4 carbon atoms, preferably 1 or 2 carbon atoms.

The alkanediyl group may be a linear chain or a branched chain, and examples thereof include the same as described in relation to the aforementioned alkanediyl group.

The alkanediyl groups represented by $R^{10}$ each preferably have 2 carbon atoms. Examples of the alkanediyl group include the same as described in relation to those represented by $R^7$. In the case where $m^2$ is 2 or 3, each of $R^{10}$ may be identical to or different from each other or one another.

The n or $m^1$ is preferably 1, and $m^2$ is preferably 1 or 2.

$R^4$ represents a C1 to C10 organic group. Examples of the organic group include the same as described in relation to those represented by $R^5$. In the case where $R^4$ is a hydrocarbyl group, the hydrocarbyl group may have a substituent. The type and the number of the substituent are the same as employed in the divalent hydrocarbyl group. From the viewpoint of hydrophilicity, $R^4$ is preferably has no cyclic structure such as cycloalkyl, aryl, aralkyl, or the like.

and

Preferred examples of groups of $R^4$ include a C1 to C10 organic group having the aforementioned hydrophilic group. A more preferred example is a monovalent group represented by the following formula (5):

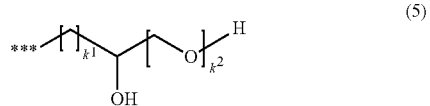

(5)

(wherein $k^1$ is an integer of 1 to 4; $k^2$ is an integer of 0 to 4; and *** denotes the position of bonding to the sulfur atom in formulas (1) and (2)) or a $C_1$ to $C_{10}$ alkyl group. A even more preferred example is a monovalent group represented by formula (5).

In formula (5), $k^1$ is preferably 1 or 2, and $k^2$ is preferably an integer of 0 to 2, more preferably 0 or 1.

The lower limit of the total amount of the repeating unit (A) is preferably 10 mol % or higher in the whole repeating units, more preferably 40 mol % or higher, from the viewpoints of provision of water solubility and prevention of non-specific adsorption. Particularly when the polymer of the present invention include a repeating unit derived from styrenes as the below-described repeating unit (B), the lower limit of the total amount of the repeating unit (A) is preferably 50 mol % or higher in the whole repeating units, more preferably 60 mol % or higher, even more preferably 65 mol % or higher.

The upper limit of the total amount of the repeating unit (A) is preferably 99 mol % or lower in the whole repeating units, more preferably 90 mol % or lower, particularly preferably 85 mol % or lower, from the viewpoints of provision of water solubility and suitable adsorption to a substrate. Particularly when the polymer of the present invention include a repeating unit derived from styrenes as the below-described repeating unit (B), the upper limit of the total amount of the repeating unit (A) is more preferably 80 mol % or lower, even more preferably 70 mol % or lower.

The lower limit of the total amount of the repeating unit (A) is preferably 20 mass % or higher in the whole repeating units, more preferably 35 mass % or higher, even more preferably 50 mass % or higher, even more preferably 60 mass % or higher, further preferably 70 mass % or higher, from the viewpoints of provision of water solubility and prevention of non-specific adsorption. Particularly when the polymer of the present invention include a repeating unit derived from styrenes as the below-described repeating unit (B), the lower limit of the total amount of the repeating unit (A) is more preferably 75 mass % or higher, even more preferably 80 mass % or higher.

The upper limit of the total amount of the repeating unit (A) is preferably 99 mass % or lower in the whole repeating units, more preferably 98 mass % or lower, even more preferably 95 mass % or lower, further preferably 90 mass % or lower, from the viewpoints of provision of water solubility and suitable adsorption to a substrate.

The content of the repeating unit (A) may be determined through $^{13}$C-NMR or a similar technique.

Preferably, the polymer of the present invention further include a hydrophobic repeating unit (hereinafter may be referred to as repeating unit (B)). As used herein, the term "hydrophobicity" refers to having weak affinity to water. In a specific case, when a homopolymer (i.e., inducing a single type repeating unit) (having a number average molecular weight of about 10,000 to about 100,000, as determined through the method disclosed in the Examples) is dissolved in an amount less than 1 g in pure water (100 g) at ambient temperature (25° C.), the repeating unit is evaluated as being hydrophobic.

From the viewpoint of attaining high hydrophobicity, the repeating unit (B) preferably has an HLB of lower than 20, more preferably lower than 15, even more preferably 0.1 or higher and lower than 10.

A known hydrophobic repeating unit may be employed as the repeating unit (B). No particular limitation is imposed on the repeating unit (B), but a repeating unit derived from at least one monomer selected from among styrenes, (meth) acrylates, and (meth)acrylamides is preferred.

Among the repeating units derived from the styrenes, preferred is a repeating unit represented by the following formula (6):

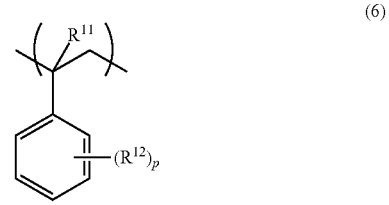

(6)

(wherein $R^{11}$ represents a hydrogen atom or a methyl group; $R^{12}$ represents a C1 to C10 organic group; and p is an integer of 0 to 5).

In formula (6), examples of organic groups represented by $R^{12}$ are the same as described in relation to those represented by $R^5$. The organic groups each preferably have 1 to 6 carbon atoms, more preferably 1 to 3 carbon atoms. The absence of a hydrophilic group is preferred. The organic groups may have a C1 to C3 alkoxy group or the like. When p is an integer of 2 to 5, each of $R^{12}$ may be identical to or different from each other or one another.

The p is an integer of 0 to 5, preferably 0 to 3, more preferably 0.

Specific examples of the repeating unit derived from styrenes include those derived from styrene, 4-methylstyrene, 2,4-dimethylstyrene, 2,4,6-trimethylstyrene, 4-ethylstyrene, 4-isopropylstyrene, 4-tert-butylstyrene, and α-methylstyrene.

Examples of the (meth)acrylate include $C_{1-10}$ alkyl (meth)acrylates such as methyl (meth)acrylate, ethyl (meth)acrylate, isobutyl (meth)acrylate, and 2-ethylhexyl (meth)acrylate; $C_{6-10}$ cycloalkyl (meth)acrylates such as cyclohexyl (meth)acrylate; $C_{1-10}$ alkoxy-$C_{1-10}$ alkyl (meth)acrylates such as 1-methoxyethyl (meth)acrylate and 2-methoxyethyl (meth)acrylate; and (meth)acrylate esters having a C8 to C16 bridged cycle hydrocarbyl group such as 1-adamantyl (meth)acrylate, 1-methyl-(1-adamantylethyl) (meth)acrylate, and tricyclo[5.2.1.0$^{2,6}$]decan-8-yl (meth)acrylate. In these (meth)acrylates, the $C_{1-10}$ alkyl group is preferably a $C_{1-6}$ alkyl group; the $C_{6-10}$ cycloalkyl group is preferably a $C_{6-8}$ cycloalkyl group; the $C_{1-10}$ akloxy group is preferably a $C_{1-6}$ alkoxy group; and the C8 to C16 bridged cycle hydrocarbyl group is preferably a C8 to C12 bridged cycle hydrocarbyl group.

The (meth)acrylate may also be a macromonomer having a (meth)acryloyloxy group at an end thereof. Examples of the macromonomer include a styrene macromonomer having a (meth)acryloyloxy group at an end thereof, a methyl (meth)acrylate macromonomer having a (meth)acryloyloxy group at an end thereof (e.g., Macromonomer AA-6, product of Toagosei Co., Ltd.), a butyl (meth)acrylate macromonomer having a (meth)acryloyloxy group at an end thereof (e.g., Macromonomer AB-6, product of Toagosei Co., Ltd.), and a dimethylsiloxane macromonomer having a (meth)acryloyloxy group at an end thereof (e.g., modified silicone oil X-22-2475, product of Shin-Etsu Chemical Co., Ltd.). By use of these macromonomers, a graft copolymer can be produced.

Among these (meth)acrylates, (meth)acrylate esters having a C8 to C16 bridged cycle hydrocarbyl group, $C_{1-10}$ alkoxy-$C_{1-10}$ alkyl (meth)acrylates, $C_{1-10}$ alkyl (meth)acrylates, and macromonomers each having a (meth)acryloyloxy group at an end thereof are preferred. More preferred are (meth)acrylate esters having a C8 to C16 bridged cycle hydrocarbyl group, $C_{1-10}$ alkoxy-$C_{1-10}$ alkyl (meth)acrylates, and $C_{1-10}$ alkyl (meth)acrylates. Even more preferred are (meth)acrylate esters having a C8 to C16 bridged cycle hydrocarbyl group and $C_{1-10}$ alkyl (meth)acrylates. Particularly preferred are $C_{1-10}$ alkyl (meth)acrylates.

Examples of the (meth)acrylamide include N,N-di-$C_{1-10}$ alkyl(meth)acrylamides; N—$C_{1-10}$ alkyl(meth)acrylamides such as N-isopropyl (meth) acrylamide; N—$C_{1-10}$ alkanoyl-$C_{1-10}$ alkyl(meth)acrylamides such as N-(1,1-dimethyl-2-acetylethyl)(meth)acrylamide; and (meth)acryloylpiperidine. Among these (meth)acrylamides, the $C_{1-10}$ alkyl group is preferably a $C_{3-10}$ alkyl group, and the $C_{1-10}$ alkanoyl group is preferably a $C_{1-6}$ alkanoyl group.

The lower limit of the total amount of the repeating unit (B) is preferably 1 mol % or higher in the whole repeating units, more preferably 10 mol % or higher, even more preferably 15 mol % or higher, from the viewpoint of suitable adsorption to a substrate. Particularly when the repeating unit (B) is derived from styrenes, the lower limit of the total amount of the repeating unit (B) is preferably 20 mol % or higher, more preferably 30 mol % or higher.

The upper limit of the total amount of the repeating unit (B) is preferably 90 mol % or lower in the whole repeating units, more preferably 80 mol % or lower, even more preferably 70 mol % or lower, further more preferably 60 mol % or lower, from the viewpoints of provision of water solubility and prevention of non-specific adsorption. Particularly when the repeating unit (B) is derived from styrenes, the upper limit of the total amount of the repeating unit (B) is more preferably 50 mol % or lower, even more preferably 40 mol % or lower, further preferably 35 mol % or lower.

The lower limit of the total amount of repeating units (B) is preferably 1 mass % or higher in the whole repeating units, more preferably 2 mass % or higher, even more preferably 3 mass % or higher, even more preferably 5 mass % or higher, further preferably 10 mass % or higher, from the viewpoint of suitable adsorption to a substrate.

The upper limit of the total amount of the repeating unit (B) is preferably 80 mass % or lower in the whole repeating units, more preferably 65 mass % or lower, even more preferably 50 mass % or lower, even more preferably 40 mass % or lower, further preferably 30 mass % or lower, from the viewpoints of provision of water solubility and prevention of non-specific adsorption. Particularly when the repeating unit (B) is derived from styrenes, the upper limit of the total amount of the repeating unit (B) is more preferably 20 mass % or lower, even more preferably 18 mass % or lower.

The content of the repeating unit (B) may be determined through the same method as employed for determining the content of the repeating unit (A).

The ratio by mole of the repeating unit (A) in the polymer to the repeating unit (B) in the polymer, (A):(B), is preferably 10:30 to 99:1, more preferably 10:20 to 99:1, from the viewpoint of prevention of non-specific adsorption. Particularly when the repeating unit (B) is derived from styrenes, the ratio is more preferably 10:15 to 50:1, even more preferably 10:10 to 10:1, particularly preferably 10:8 to 10:3.

The ratio by mass of the repeating unit (A) in the polymer to the repeating unit (B) in the polymer, (A):(B), is preferably 40:60 to 99:1, more preferably 55:45 to 99:1, even more preferably 60:40 to 99:1, from the viewpoint of prevention of non-specific adsorption. Particularly when the repeating unit (B) is derived from styrenes, the ratio is more preferably 70:30 to 98:2, particularly preferably 75:25 to 90:10.

From the viewpoint of prevention of non-specific adsorption, the following combinations of the hydrophilic repeating unit (A) and the hydrophobic repeating unit (B) are preferred. Specifically, a combination of:

(A) from 60 to 99 mass % of a hydrophilic repeating unit represented by formula (2) and (B) from 10 to 40 mass % of a hydrophobic repeating unit derived from at least one monomer selected from among styrenes, (meth)acrylates, and (meth)acrylamides is preferred. A combination of:

(A) from 60 to 99 mass % of a hydrophilic repeating unit represented by formula (2), having 0 to 3 hydroxy groups in a side chain thereof shown in formula (2) and (B) from 1 to 40 mass % of a hydrophobic repeating unit derived from at least one monomer selected from among styrenes, (meth)acrylate esters having a C8 to C16 bridged cycle hydrocarbyl group, $C_{1-10}$ alkoxy-$C_{1-10}$ alkyl (meth)acrylates, $C_{1-10}$ alkyl (meth)acrylates, and (meth)acrylamides is more preferred. A combination of:

(A) from 60 to 99 mass % of a hydrophilic repeating unit represented by formula (2), having 1 to 3 hydroxy groups in a side chain thereof shown in formula (2) and (B) from 1 to 40 mass % of a hydrophobic repeating unit derived from at least one monomer selected from among styrenes, (meth)acrylate esters having a C8 to C16 bridged cycle hydrocarbyl group, $C_{1-10}$ alkyl (meth)acrylates, and (meth)acrylamides is even more preferred. A combination of:

(A) from 70 to 99 mass % of a hydrophilic repeating unit represented by formula (2), having 1 to 3 hydroxy groups in a side chain thereof shown in formula (2), wherein $R^2$ is *—(C=O)—O— and (B) from 1 to 30 mass % of a hydrophobic repeating unit derived from at least one monomer selected from among styrenes, $C_{1-10}$ alkyl (meth)acrylates, and (meth)acrylamides is particularly preferred.

The polymer of the present invention may further include a hydrophilic repeating unit (C) other than the repeating unit (A). Examples of the hydrophilic repeating unit (C) include those derived from an anionic monomer, a cationic monomer, or a nonionic monomer. The polymer of the invention may include one or more hydrophilic repeating units (C).

Examples of the anionic monomer include unsaturated carboxylic acid monomers such as vinyl benzoate and (meth)acrylic acid; and unsaturated sulfonic acid monomers such as styrenesulfonic acid, 2-acrylamide-2-methylpropanesulfonic acid, and isoprenesulfonic acid. By use of a unsaturated sulfonic acid monomer, the effect of suppressing signals attributed to non-specific samples can be enhanced, when the hydrophilizing agent of invention is used as a diluent for an immuno-diagnostic agent.

Examples of the cationic monomer include those having a primary to quaternary amino group and a unsaturated bond; such as allylamine, aminostyrene, N,N-dimethylaminopropyl (meth)acrylamide methyl chloride quaternary salt.

Examples of the nonoionic monomer include unsaturated carboxylate ester monomers having a hydroxy group such as hydroxyethyl (meth)acrylate, glyceryl (meth)acrylate, and polyoxyethylene (meth)acrylate; and (meth)acrylamide monomers having a hydroxy group such as N-(2-hydroxyethyl)(meth)acrylamide.

The total amount of repeating units (C) is preferably 0 to 49 mol % in the whole repeating units, more preferably 0 to 20 mol %, even more preferably 0 to 10 mol %, particularly preferably 0 to 1 mol %, and preferably 0 to 49 mass %, more preferably 0 to 20 mass %, even more preferably 0 to 10 mass %, particularly preferably 0 to 1 mass %.

In the case where the polymer of the present invention is a copolymer, no particular limitation is imposed on the mode of arrangement of the repeating units. The polymer of the present invention may be any of a block copolymer, a graft copolymer, a random copolymer, and an alternating copolymer.

Each end of the polymer of the present invention is preferably a hydrogen atom, an alkyl group, a hydroxy group, or an RAFT agent residue is preferred.

The polymer of the present invention preferably has a number average molecular weight ($M_n$) of 5,000 to 1,000,000, more preferably 7,000 to 200,000, particularly preferably 10,000 to 150,000. When the number average molecular weight is 5,000 or higher, non-specific adsorption inhibitory effect is enhanced, whereas when the molecular weight is 1,000,000 or lower, coating performance and handing performance are improved.

The molecular distribution factor ($M_w/M_n$) is preferably 1.0 to 5.0, more preferably 1.0 to 4.0, even more preferably 1.0 to 3.0, particularly preferably 1.5 to 2.5.

The number average molecular weight and the molecular weight distribution factor may be determined through the procedure described in the Examples hereinbelow.

The polymer of the present invention is preferably water-soluble, form the viewpoint of prevention of non-specific adsorption. As used herein, the term "water-soluble" refers to that when a polymer is mixed in water (25° C.) so that a polymer solid content is 1 mass %, the mixture assumes transparent visually.

The polymer of the present invention is preferably non-ionic.

From the viewpoints of provision of water solubility and prevention of non-specific adsorption, the polymer of the present invention preferably has an HLB of 10 to 22.

Next, the method for producing the polymer of the present invention will be described.

The polymer of the present invention may be produced through, for example, any of the following routes: (1) incorporating a sulfide group into a side chain of a known polymer, and converting the sulfide group to a sulfinyl group; (2) polymerizing a monomer having a sulfide group in a moiety to be a side chain, or copolymerizing the monomer with another monomer, and converting the sulfide group of the produced (co)polymer into a sulfinyl group; and (3) polymerizing a monomer having a sulfinyl group in a moiety to be a side chain, or copolymerizing the monomer with another monomer.

The production routes will next be described in detail, taking the following copolymer (N-1) as an example.

Specifically, copolymer (S-1) is produced through step 1-A-1 and step 1-A-2, or through step 1-B or step 1-C. The thus-produced copolymer is converted to copolymer (N-1) via copolymer (G-1).

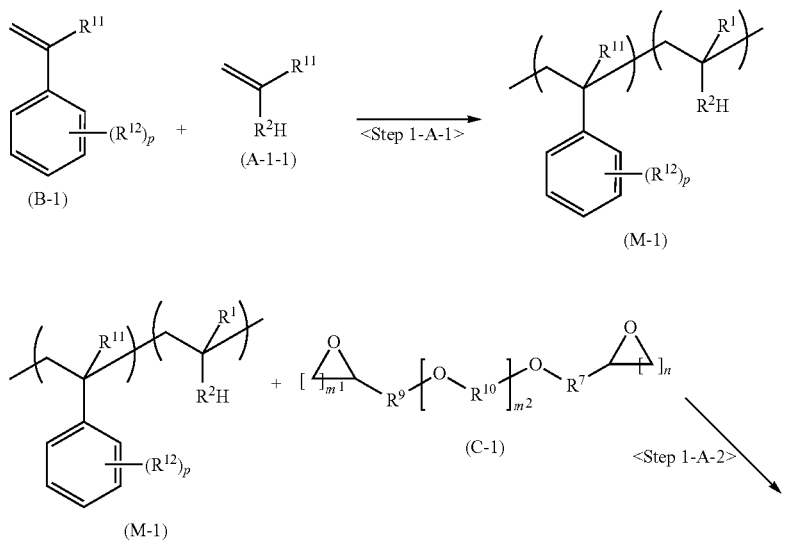

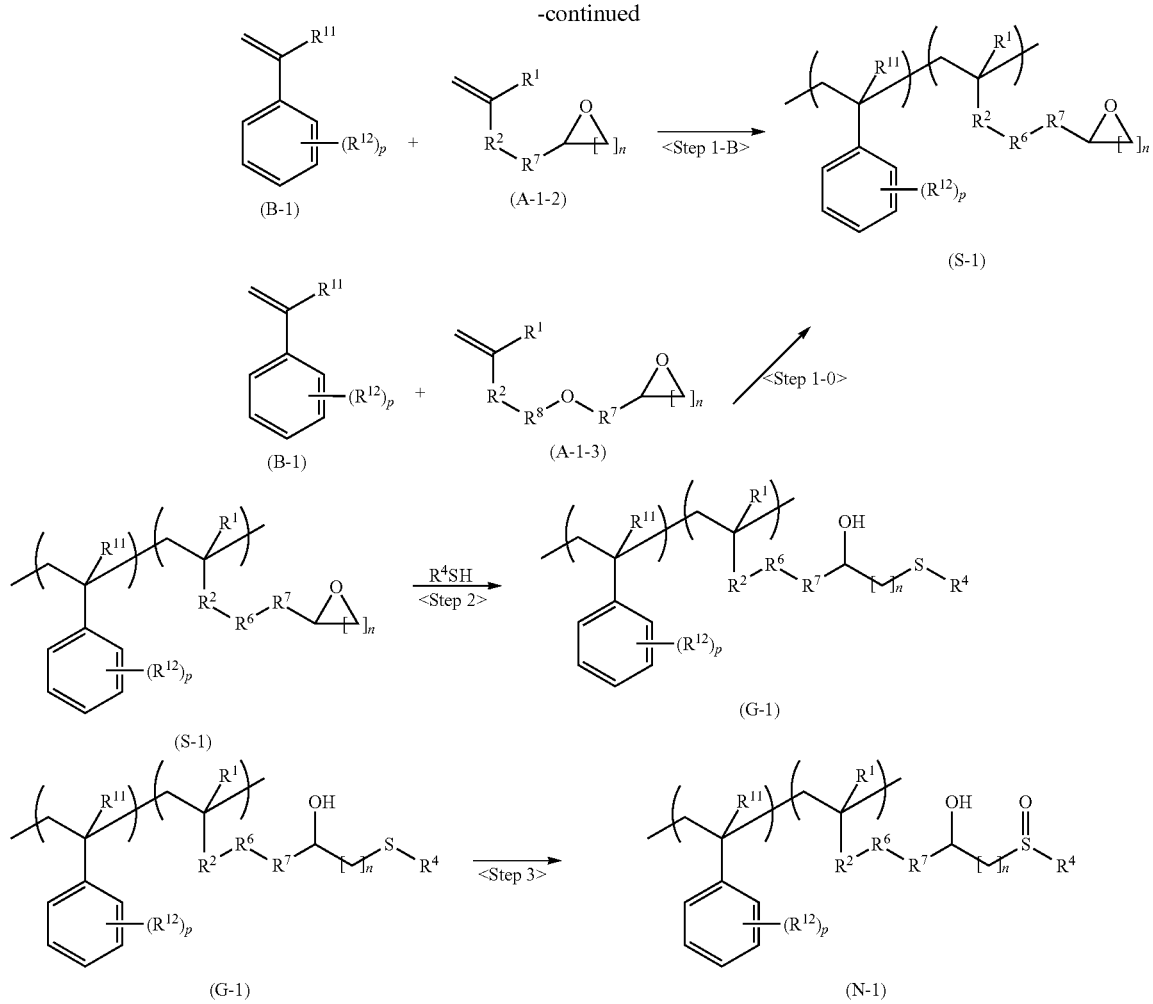

(in the schemes, the symbols have the same meanings as defined above)

<Step 1-A-1>

In step 1-A-1, compound (A-1-1) and compound (B-1) are polymerized in the presence of a polymerization initiator, to thereby yield copolymer (M-1).

Examples of compound (A-1-1) include (meth)acrylic acid. such compounds may be used singly or in combination of two or more species.

Examples of compound (B-1) include the aforementioned styrenes. The total amount of styrenes with respect to 1 eq. by mole of compound (A-1-1) is preferably 0.001 to 1.5 eq. by mole, more preferably 0.005 to 0.8 eq. by mole, even more preferably 0.02 to 0.8 eq. by mole, particularly preferably 0.3 to 0.8 eq. by mole.

Examples of the polymerization initiator include azo-type initiators such as 2,2'-azobis(isobutyronitrile), dimethyl 2,2'-azobis(2-methylpropionate), and 2,2'-azobis(4-methoxy-2,4-dimethylvaleronitrile; and peroxides such as di(3,5,5-trimethylhexanoyl) peroxide and benzoyl peroxide. These polymerization initiators may be used singly or in combination of two or more species.

The total amount of polymerization initiators with respect to the amount of compound (A-1-1) is generally about 0.0002 to about 0.2 times by mass.

In step 1-A-1, a solvent or a chain-transfer agent may be used. Examples of the solvent include amides such as dimethylformamide, dimethylacetamide, and N-methylpyrrolidone; sulfoxides such as dimethyl sulfoxide; esters such as ethyl acetate, butyl acetate, and γ-butyrolactone; aromatics such as toluene and benzene; ethers such as 1,4-dioxane and diethyl ether. These solvent may be used singly or in combination of two or more species. The total amount of solvents with respect to the amount of compound (A-1-1) is generally about 0.5 to about 15 times by mass.

Examples of the chain-transfer agent include mercaptoethanol, thioglycerol, and tert-dodecylmercaptan.

No particular limitation is imposed on the reaction time of step 1-A-1, but the reaction time is generally about 0.5 to about 24 hours. The reaction temperature may be an appropriate temperature equal to or lower than the boiling point of the solvent employed, and is generally about 0 to about 120° C.

<Step 1-A-2

In step 1-A-2, —$R^2$ of copolymer (M-1) produced in step 1-A-1 is added in a ring-opening manner to a glycidyl group or an oxetanyl group of compound (C-1), to thereby yield copolymer (S-1).

Examples of compound (C-1) used in step 1-A-2 include ethylene glycol diglycidyl ether and propylene glycol diglycidyl ether. The total amount of such compounds, with respect to 1 eq. by mole of the repeating unit in copolymer (M-1) derived from compound (A-1-1), is preferably 1.5 to 10 eq. by mole, more preferably 2 to 5 eq. by mole.

Step 1-A-2 is preferably carried out in the presence of a catalyst. Examples of the catalyst include quaternary ammonium salts such as tetrabutylammonium bromide; and quaternary phosphonium salts such as tetrabutylphosphonium bromide and tetrabutylphosphonium chloride. These catalysts may be used singly or in combination of two or more species.

The total amount of the catalyst, with respect to 1 eq. by mole of the repeating unit in copolymer (M-1) derived from compound (A-1-1), is generally about 0.01 to about 0.2 eq. by mole.

Examples of the solvent suitably employed in step 1-A-2 are the same as described in relation to step 1-A-1.

No particular limitation is imposed on the reaction time of step 1-A-2, but the reaction time is generally about 1 to about 24 hours. The reaction temperature may be an appropriate temperature equal to or lower than the boiling point of the solvent employed, and is generally about 40 to about 200° C.

<Step 1-B and step 1-C>

In step 1-B or step 1-C, compound (A-1-2) or compound (A-1-3) is polymerized with compound (B-1) in the presence of a polymerization initiator, to thereby yield copolymer (S-1).

Examples of compound (A-1-2) include glycidyl (meth) acrylate and oxetanyl (meth)acrylate, and examples of compound (A-1-3) include vinyl benzyl glycidyl ether and 4-hydroxybutyl (meth)acrylate glycidyl ether. These compounds may be used singly or in combination of two or more species.

Step 1-B and step 1-C may be carried out in a manner similar to that of step 1-A-1.

Before performing step 1-A-1,1-A-2, step 1-B, and step 1-C, if one monomer is reacted with an RAFT agent, a block copolymer can be synthesized. Examples of the RAFT agent include dodecylcyanomethyl trithiocarbonate, 2-methyl-2-[(dodecylsulfanyl thiocarbabonyl)sulfanyl]propanic acid, and 2-cyano-2-propyldodecyl trithiocarbonate. The amount of the RAFT agent with respect to that of the monomers is generally 0.00001 to 0.1 times by mass.

Also, compound (B-1) may be changed to a compound deriving the aforementioned repeating unit (B) in copolymerization. If a macromonomer is used as the compound, a graft copolymer can be synthesized.

<Step 2>

In step 2, —SR$^4$ is added in a ring-opening manner to a glycidyl group or an oxetanyl group of copolymer (S-1), which has been produced in step 1-A-2, step 1-B, or step 1-C, to thereby yield copolymer (G-1).

Examples of the compound R$^4$SH used in step 2 include thioglycerol and mercaptoethanol. From the viewpoint of enhancement of hydrophilicity, thioglycerol is preferred.

The total amount of the compound, with respect to 1 eq. by mole of the repeating unit derived from compound (A-1-1), (A-1-2), or (A-1-3), is generally 0.1 to 20 eq. by mole, preferably 1 to 10 eq. by mole.

Step 2 is preferably carried out in the presence of catalyst. Examples of the catalyst include basic catalysts such as triethylamine and N,N-dimethyl-4-aminopyridine. These catalysts may be used singly or in combination of two or more species.

The total amount of the catalyst to be used, with respect to 1 eq. by mole of the repeating unit derived from compound (A-1-1), (A-1-2), or (A-1-3), is generally 0.01 to 32 eq. by mole.

Also, step 2 is preferably carried out in the presence of a solvent. Examples of the solvent include those employable in step 1; alcohols such as ethanol and methanol; and a mixture thereof. The total amount of the solvent with respect to the amount of copolymer (S-1) is generally about 0.5 to 20 times by mass.

No particular limitation is imposed on the reaction time of step 2, but the reaction time is generally about 1 to about 8 hours. The reaction temperature may be an appropriate temperature equal to or lower than the boiling point of the solvent employed, and is generally about 40 to about 100° C.

In an alternative way, step 2 may be carried out before step 1-B or step 1-C, and then polymerization; i.e., step 1-B or step 1-C, may be carried out.

<Step 3>

In step 3, a sulfide group of copolymer (G-1) produced in step 2 is converted to a sulfinyl group by use of an oxidizing agent, to thereby yield copolymer (N-1). So long as the effects of the present invention are not impaired, a part of sulfinyl groups present in the copolymer may be converted to a sulfide group or a sulfonyl group.

The aforementioned oxidizing agent is divided into an organic oxidizing agent and an inorganic oxidizing agent. Examples of the organic oxidizing agent include peracetic acid, perbenzoic acid, and m-chloroperbenzoic acid. Examples of the inorganic oxidizing agent include hydrogen peroxide, chromic acid, and a permanganate salt. These oxidizing agents may be used singly or in combination of two or more species.

The amount of oxidizing agent to be used, with respect to 1 eq. by mole of the repeating unit derived from compound (A-1-1), (A-1-2), or (A-1-3), is generally about 1.0 to about 10.0 eq. by mole, preferably 1.0 to 2.0 eq. by mole.

Also, step 3 is preferably carried out in the presence of a solvent. Examples of the solvent include water; amides such as dimethylformamide and dimethylacetamide; and alcohols such s methanol and ethanol. These solvents may be used singly or in combination of two or more species. Among them, water and alcohols are preferred.

The total amount of solvents with respect to the amount of copolymer (G-1) is generally about 1 to about 20 times by mass, preferably 1 to 15 times by mass.

No particular limitation is imposed on the reaction time of step 3, but the reaction time is generally about 1 to about 24 hours. The reaction temperature may be an appropriate temperature equal to or lower than the boiling point of the solvent employed, and is generally about 25 to about 70° C.

In each step, if needed, a reaction product may be isolated through an appropriate combination of common isolation means such as filtration, washing, drying, recrystallization, reprecipitation, dialysis, centrifugation, solvent extraction, neutralization, and chromatography.

The thus-produced polymers of the present invention (including a random copolymer, an alternating copolymer, a block copolymer, and a graft copolymer) have excellent protein activity-maintaining effect and excellent effect of inhibiting non-specific adsorption of protein and lipid. Although the reason for attaining such non-specific adsorption inhibitory effect has not been clearly elucidated, the present inventors conceive the following mechanism. That is, the polymer is adsorbed onto a wall of a container, an instrument, or the like via the repeating unit (B), which also provides a certain interaction with protein, lipid, and the like. On the other hand, the repeating unit (A) hydrophilizes the wall, to thereby further prevent adsorption of protein, lipid, and the like.

Thus, a non-specific adsorption inhibiting agent containing the polymer of the present invention is useful as a surface-hydrophilizing agent for solid phase or the like, and as a hydrophilicity-imparting agent, a surface-improving agent, a polymer surfactant, a dispersant, or the like. The non-specific adsorption inhibiting agent is widely employed in the field of clinical tests, diagnostic agents, and the like. The non-specific adsorption inhibiting agent finds possible uses including a clinical and diagnostic agent, clinical and diagnostic apparatus, a bio-chip, a cell culture base, and a coating agent for a material (e.g., solid phase, container, and instrument) which is in contact with a bio-substance such as a bio-material; a conditioning agent, a washing agent, a rinsing liquid for assay cells of an automated analyzer employed in diagnosis such as a blood test; a diluent for a diagnostic agent, a reaction solvent, and additive for a preservative or the like; a cell adhesion controlling agent; a protein stabilizer contained in a clinical and diagnostic agent or the like; and an enzyme stabilizer.

Next, the surface-hydrophilizing agent of the present invention will be described.

The surface-hydrophilizing agent contains the aforementioned polymer.

Also, the surface-hydrophilizing agent may contain solvent. Examples of the solvent include water; and alcohols such as methanol, ethanol, and isopropyl alcohol. These solvents may be contained singly or in combination of two or more species. From the viewpoint of prevention of non-specific adsorption, the amount of the solvent is preferably such an amount that the amount of the polymer of the present invention is adjusted to 0.001 to 15 mass %, more preferably to 0.01 to 10 mass %.

In addition to the polymer and the solvent, the surface-hydrophilizing agent of the present invention may further contain a sterilizing agent, an antiseptic agent, or the like.

Then, a substrate having a hydrophilic surface may be produced by bringing the substrate into contact with the aforementioned surface-hydrophilizing agent. The production of the substrate having a hydrophilic surface may be performed in the same manner as a general coating method of the base with a surface-hydrophilizing agent. Some specific examples of the method are as follows:

(1) bringing a surface-hydrophilizing agent solution into contact with a substrate, and physically adsorbing the surface-hydrophilizing agent on the surface of the substrate in the solution, with the solvent remaining; and (2) bringing a surface-hydrophilizing agent solution into contact with a substrate, and evaporating the solvent through drying, to thereby form a dry film of the surface-hydrophilizing agent on the surface of the substrate.

In the above method (1), after physical adsorption of the surface-hydrophilizing agent on the substrate surface in the solution, and generally, the solvent is removed by tilting the substrate to cause flow of the solvent, by pulling up the substrate from the solution, by blowing off the solution remaining on the substrate, by adding a large amount of solvent, or by a similar technique, whereby there is produced a substrate on which the surface-hydrophilizing agent has been adsorbed. In the present invention, method (1) is preferred, since the load to the environment is low, and the surface-hydrophilizing agent is not dissolved during the use of the hydrophilized substrate.

The substrate for producing the substrate having a hydrophilic surface preferably has a hydrophobic surface. The substrate may be made of either an inorganic material or an organic material. However, since the surface-hydrophilizing agent of the present invention can receive surface hydrophilization treatment at low temperature, an organic material is preferred.

The organic material is preferably a polymer material. Examples of the polymer material include styrene polymers such as polystyrene and ABS resin; olefin polymers (including cyclic olefin resins) such as polyethylene and polypropylene; vinyl polymers such as polyvinyl acetate, polyvinyl chloride, polyvinylcarbazole, and polyvinylpyrroldine; vinylidene halide polymers such as polyvinylidene chloride and polyvinylidene fluoride; amide polymers such as polyamide and polyacrylamide; imide polymers such as polyimide and polyethyleneimide; silicone polymers such as polysiloxane and polydimethylsiloxane; nitrile polymers such as polyacetonitrile and polyacrylonitrile; vinylphenol polymers such as polyvinylphenol; vinyl alcohol polymers such as polyvinyl alcohol; urethane polymers such as polyurethane; carbonate polymers such as polycarbonate; benzimidazole polymers such as polybenzimidazole; polyetherether ketone polymers such as polyether-ether ketone; aniline polymers such as polyaniline; poly(meth)acrylates such as polyacrylate; polyesters such as polycaprolactone (including aromatic polyesters such as polyethylene terephthalate, and polyesters derived from hydroxycarboxylic acid such as polyglycolic acid, polylactic acid, or polylactic acid-glycolic acid); epoxy resins (including SU-8); phenolic resins; melamine resin; known resist materials, sugar-chain polymer, and protein. These polymer materials may be contained singly or in combination of two or more species.

Examples of the sugar-chain polymer include polysaccharides such as agarose and a derivative thereof, cellulose and a derivative thereof (e.g., cellulose acetate). Examples of the protein include collagen and a derivative thereof.

Among these organic materials, a styrene polymer is preferred in the present invention.

EXAMPLES

The present invention will next be described in detail by way of examples, which should not be construed as limiting the invention thereto.

Analyses were carried out in the Examples under the following conditions.

<Molecular Weight Measurement>

Weight average molecular weight (Mw) and number average molecular weight (Mn) were measured through gel permeation chromatography (GPC) by use of TSKgel α-M column (product of Tosoh Corporation) and polystyrene as a standard under the following analytical conditions: flow rate; 0.5 mL/min, elution solvent; NMP solvent ($H_3PO_4$: 0.016 M, LiBr: 0.030 M), and column temperature: 40° C.

<NMR Spectra>

$^{13}$C-NMR spectra were measured by means of AVANCE 500 (500 MHz) (product of BRUKER) with d6-DMSO as a solvent and an internal standard.

<Absorbance Measurement>

Absorbance was measured at 450 nm by means of 680 microplate reader (product of Nippon Bio-Rad Laboratories K.K.).

<Contact Angle Measurement>

Contact angle was measured by means of a contact angle meter (DROP MASTER 500, product of Kyowa Interface Science Co., Ltd.). Specifically, contact angle of water was measured through the θ/2 method, 10 seconds after dropwise addition of water.

Example 1

Synthesis of Copolymer (N-1-1)

Copolymer (N-1-1) was produced through the following synthesis scheme.

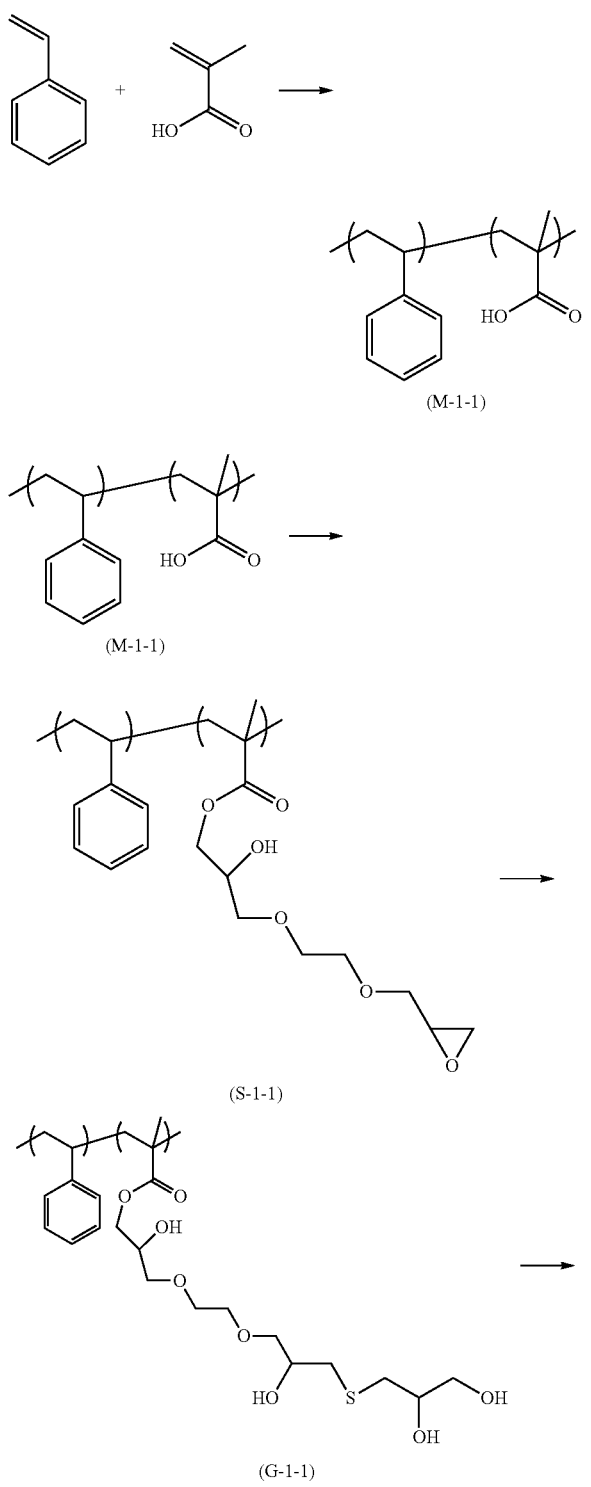

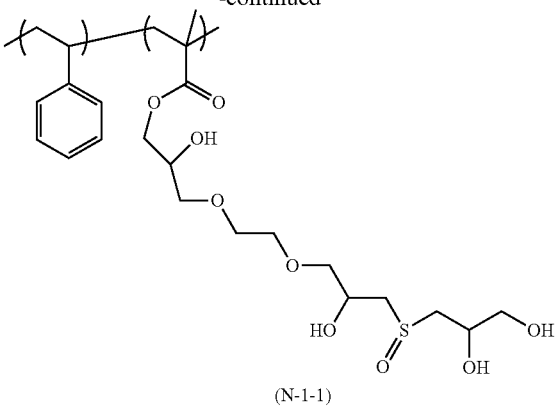

Methacrylic acid (6.79 g), styrene (2.27 g), 2,2'-azobis (isobutyronitrile) (0.272 g) serving as a polymerization initiator, and N,N-dimethylformamide (18.9 g) were mixed together and transferred to a flask. While nitrogen was blown in the flask, the mixture was heated to 70° C. and allowed to polymerize for 6 hours. The reaction mixture was cooled to room temperature, to thereby produce copolymer (M-1-1).

Subsequently, ethylene glycol diglycidyl ether (41.2 g) and tetrabutylammonium bromide (2.54 g) serving as a catalyst were dissolved in a solution containing the thus-produced copolymer (M-1-1). While nitrogen was blown in the solution, the solution was heated to 100° C. and allowed to react for 12 hours. The reaction mixture was cooled to room temperature. The solution was purified through re-precipitation in methanol, and the purified solution was dried under reduced pressure, to thereby produce copolymer (S-1-1).

The thus-produced copolymer (S-1-1) was found to contain a repeating unit derived from methacrylic acid in an amount of 80 mol % and contain a repeating unit derived from styrene in an amount of 20 mol %. These repeating unit contents were determined through $^{13}$C-NMR.

Next, the thus-produced copolymer (S-1-1) (1 g), thioglycerol (3.02 g), and N,N-dimethylformamide (9.45 g) were mixed together and transferred to a flask. While nitrogen was blown in the flask, the mixture was heated to 60° C. Triethylamine (11.3 g) serving as a catalyst was added to the mixture, and the mixture was allowed to react for 4 hours. The reaction mixture was cooled to room temperature. The solution was purified through re-precipitation in water and lyophilized, to thereby produce copolymer (G-1-1).

Then, the thus-produced copolymer (G-1-1) (0.1 g) was dispersed in water (0.857 g), and the dispersion was transferred to a flask. To the dispersion, 30% aqueous hydrogen peroxide (0.043 g) was added, and the mixture was allowed to react at room temperature for 18 hours. The thus-formed aqueous solution was dialyzed, to thereby produce copolymer (N-1-1) (yield: 15%). When copolymer (N-1-1) was mixed with water so as to adjust the copolymer concentration to 1 mass %, copolymer (N-1-1) was in a dissolution state in water.

The produced copolymer (N-1-1) was found to have a number average molecular weight of 25,632 and a molecular weight distribution factor of 2.40.

The structure of copolymer (N-1-1) was confirmed through $^{13}$C-NMR.

Example 2

Synthesis of copolymer (N-1-2)

Copolymer (N-1-2) was produced through the following synthesis scheme.

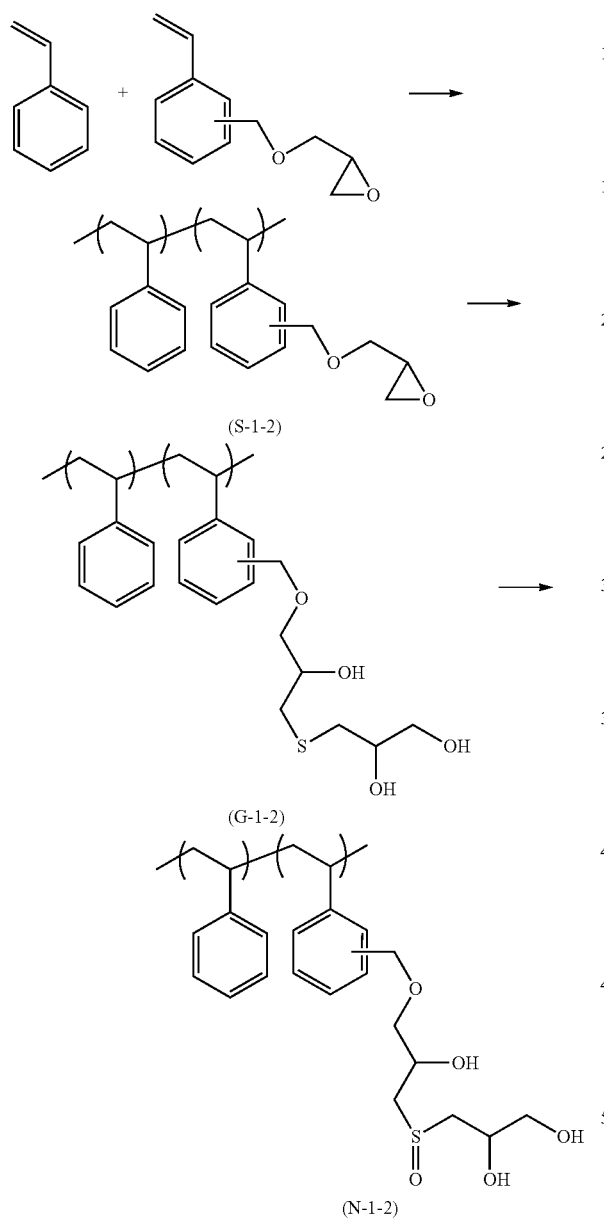

Vinyl benzyl glycidyl ether (m- and p-mixture) (6.79 g), styrene (2.27 g), and 2,2'-azobis(isobutyronitrile) serving as a polymerization initiator (0.272 g), and N,N-dimethylformamide (18.9 g) were mixed together and transferred to a flask. While nitrogen was blown in the flask, the mixture was heated to 70° C. and allowed to polymerize for 8 hours. The reaction mixture was cooled to room temperature. The solution was purified through re-precipitation in methanol, and the purified solution was dried under reduced pressure, to thereby produce copolymer (S-1-2).

The thus-produced copolymer (S-1-2) was found to contain a repeating unit derived from vinyl benzyl glycidyl ether in an amount of 62 mol % and contain a repeating unit derived from styrene in an amount of 38 mol %. The contents of these repeating units were determined through the same method as employed in Example 1.

Next, the thus-produced copolymer (S-1-2) (1 g), thioglycerol (3.37 g), and N,N-dimethylformamide (9.45 g) were mixed together and transferred to a flask. While nitrogen was blown in the flask, the mixture was heated to 60° C. Triethylamine (12.6 g) serving as a catalyst was added to the mixture, and the mixture was allowed to react for 4 hours. The reaction mixture was cooled to room temperature. The solution was purified through re-precipitation in water and lyophilized, to thereby produce copolymer (G-1-2).

Then, the thus-produced copolymer (G-1-2) (0.1 g) was dispersed in water (0.853 g), and the dispersion was transferred to a flask. To the dispersion, 30% aqueous hydrogen peroxide solution (0.047 g) was added, and the mixture was allowed to react at room temperature for 18 hours. The thus-formed aqueous solution was dialyzed, to thereby produce copolymer (N-1-2) (yield: 21%). When copolymer (N-1-2) was mixed with water so as to adjust the copolymer concentration to 1 mass %, copolymer (N-1-2) was in a dissolution state in water.

The produced copolymer (N-1-2) was found to have a number average molecular weight of 19,502 and a molecular weight distribution factor of 2.31.

The structure of copolymer (N-1-2) was confirmed through $^{13}$C-NMR.

Example 3

Synthesis of copolymer (N-1-3)

Copolymer (N-1-3) was produced through the following synthesis scheme.

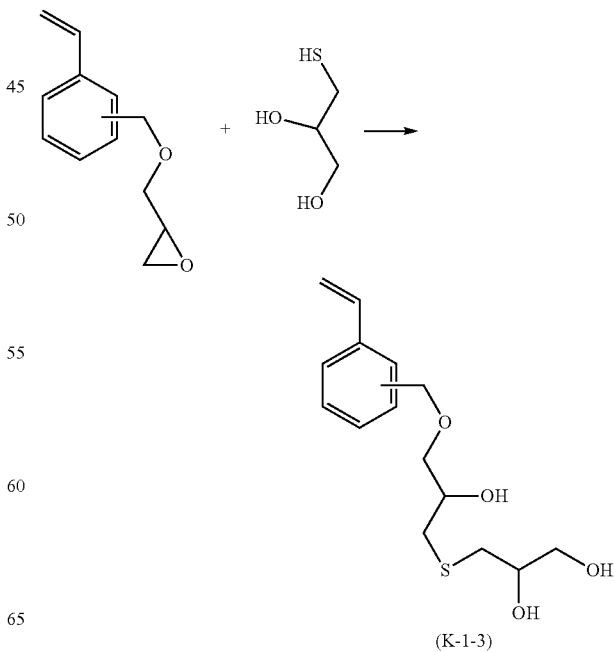

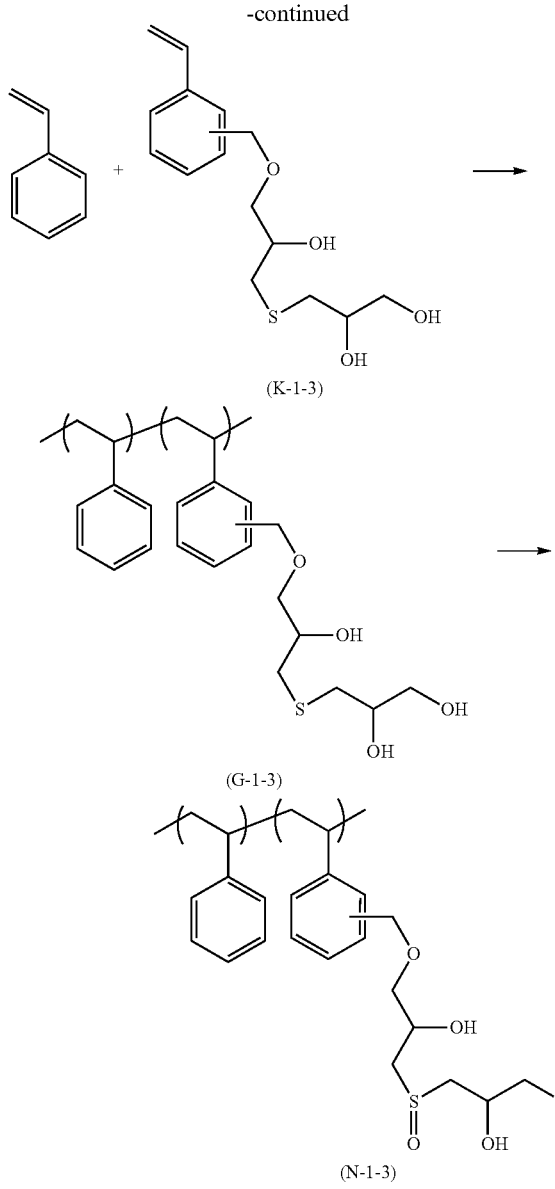

(K-1-3)

(G-1-3)

(N-1-3)

Vinyl benzyl glycidyl ether (m- and p-mixture) (15.0 g), thioglycerol (17.1 g), and isopropyl alcohol (39.0 g) were mixed together and transferred a flask. Triethylamine (15.9 g) serving as a catalyst was added to the mixture. While nitrogen was blown in the flask, the mixture was heated to 30° C., and the mixture was allowed to react for 1 hour. The reaction mixture was cooled to room temperature. Isopropyl alcohol of the solution was removed by means of rotary evaporator, and the solid was dissolved in ethyl acetate (90.2 g). Impurities were extracted with water (150 mL), and remaining ethyl acetate was removed by means of a rotary evaporator, to thereby produce compound (K-1-3).

The thus-produced compound (K-1-3) (7.48 g), styrene (1.58 g), and 2,2'-azobis(isobutyronitrile) serving as a polymerization initiator (0.272 g), and N,N-dimethylformamide (18.9 g) were mixed together and transferred to a flask. While nitrogen was blown in the flask, the mixture was heated to 70° C. and allowed to polymerize for 8 hours. The reaction mixture was cooled to room temperature. The solution was purified through re-precipitation in water and lyophilized, to thereby produce copolymer (G-1-3).

The thus-produced copolymer (G-1-3) was found to contain a repeating unit derived from compound (K-1-3) in an amount of 61 mol % and contain a repeating unit derived from styrene in an amount of 39 mol %. The contents of these repeating units were determined through the same method as employed in Example 1.

Then, the thus-produced copolymer (G-1-3) (0.1 g) was dispersed in water (0.853 g), and the dispersion was transferred to a flask. To the dispersion, 30% aqueous hydrogen peroxide (0.047 g) solution was added, and the mixture was allowed to react at room temperature for 18 hours. The thus-formed aqueous solution was dialyzed, to thereby produce copolymer (N-1-3) (yield: 15%). When copolymer (N-1-3) was mixed with water so as to adjust the copolymer concentration to 1 mass %, copolymer (N-1-3) was in a dissolution state in water.

The produced copolymer (N-1-3) was found to have a number average molecular weight of 17,405 and a molecular weight distribution factor of 2.01.

The structure of copolymer (N-1-3) was confirmed through $^{13}$C-NMR.

Example 4

Synthesis of copolymer (N-1-4)

Copolymer (N-1-4) was produced through the following synthesis scheme.

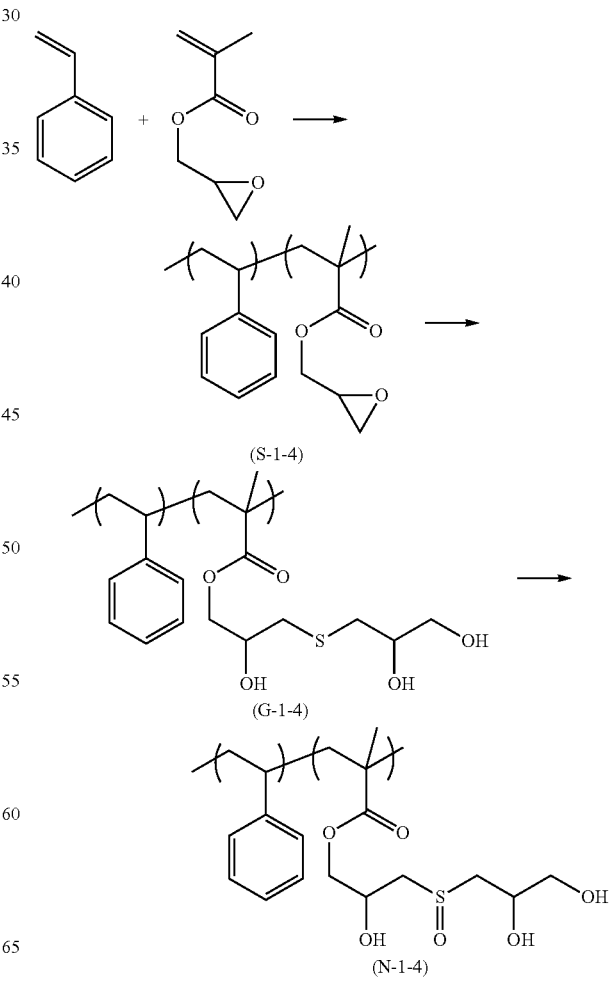

(S-1-4)

(G-1-4)

(N-1-4)

Glycidyl methacrylate (6.79 g), styrene (2.27 g), 2,2'-azobis(isobutyronitrile) (0.272 g) serving as a polymerization initiator, and N,N-dimethylformamide (18.9 g) were mixed together and transferred to a flask. While nitrogen was blown in the flask, the mixture was heated to 70° C. and allowed to polymerize for 6 hours. The reaction mixture was cooled to room temperature, and the obtained solution was purified through re-precipitation in methanol. The purified solution was dried under reduced pressure, to thereby produce copolymer (S-1-4).

The thus-produced copolymer (S-1-4) was found to contain a repeating unit derived from glycidyl methacrylate in an amount of 67 mol % and contain a repeating unit derived from styrene in an amount of 33 mol %. The contents of these repeating units were determined through the same method as employed in Example 1.

Next, the thus-produced copolymer (S-1-4) (1 g), thioglycerol (4.47 g), and N,N-dimethylformamide (9.45 g) were mixed together and transferred to a flask. While nitrogen was blown in the flask, the mixture was heated to 60° C. Triethylamine (16.7 g) serving as a catalyst was added to the mixture, and the mixture was allowed to react for 4 hours. The reaction mixture was cooled to room temperature. The solution was purified through re-precipitation in water and lyophilized, to thereby produce copolymer (G-1-4).

Then, the thus-produced copolymer (G-1-4) (0.1 g) was dispersed in water (0.844 g), and the dispersion was transferred to a flask. To the dispersion, 30% aqueous hydrogen peroxide solution (0.056 g) was added, and the mixture was allowed to react at room temperature for 18 hours. The thus-formed aqueous solution was dialyzed, to thereby produce copolymer (N-1-4) (yield: 27%). When copolymer (N-1-4) was mixed with water so as to adjust the copolymer concentration to 1 mass %, copolymer (N-1-4) was in a dissolution state in water.

The produced copolymer (N-1-4) was found to have a number average molecular weight of 23,309 and a molecular weight distribution factor of 2.17.

The structure of copolymer (N-1-4) was confirmed through $^{13}$C-NMR.

Example 5

Synthesis of copolymer (N-1-5)

Copolymer (N-1-5) was produced through the same synthesis route as employed in Example 4.

Glycidyl methacrylate (4.53 g), styrene (4.53 g), 2,2'-azobis(isobutyronitrile) (0.272 g) serving as a polymerization initiator, and N,N-dimethylformamide (18.9 g) were mixed together and transferred to a flask. While nitrogen was blown in the flask, the mixture was heated to 70° C. and allowed to polymerize for 6 hours. The reaction mixture was cooled to room temperature, and the obtained solution was purified through re-precipitation in methanol. The purified solution was dried under reduced pressure, thereby produce copolymer (S-1-5).

The thus-produced copolymer (S-1-5) was found to contain a repeating unit derived from glycidyl methacrylate in an amount of 45 mol % and contain a repeating unit derived from styrene in an amount of 55 mol %. The contents of these repeating units were determined through the same method as employed in Example 1.

Next, the thus-produced copolymer (S-1-5) (1 g), thioglycerol (3.21 g), and N,N-dimethylformamide (9.45 g) were mixed together and transferred into a flask. While nitrogen was blown in the flask, the mixture was heated to 60° C. Triethylamine (12.0 g) serving as a catalyst was added to the mixture, and the mixture was allowed to react for 4 hours. The reaction mixture was cooled to room temperature. The solution was purified through re-precipitation in water and lyophilized, to thereby produce copolymer (G-1-5).

Then, the thus-produced copolymer (G-1-5) (0.1 g) was dispersed in water (0.855 g), and the dispersion was transferred to a flask. To the dispersion, 30% aqueous hydrogen peroxide solution (0.045 g) was added, and the mixture was allowed to react at room temperature for 18 hours. The thus-formed aqueous solution was dialyzed, to thereby produce copolymer (N-1-5) (yield: 15%). When copolymer (N-1-5) was mixed with water so as to adjust the copolymer concentration to 1 mass %, copolymer (N-1-5) was in a dissolution state in water.

The produced copolymer (N-1-5) was found to have a number average molecular weight of 28,000 and a molecular weight distribution factor of 1.69.

Example 6

Synthesis of Copolymer (N-1-6)

Copolymer (N-1-6) was produced through the same synthesis route as employed in Example 4.

Glycidyl methacrylate (3.02 g), styrene (6.04 g), 2,2'-azobis(isobutyronitrile) (0.272 g) serving as a polymerization initiator, and N,N-dimethylformamide (18.9 g) were mixed together and transferred to a flask. While nitrogen was blown in the flask, the mixture was heated to 70° C. and allowed to polymerize for 6 hours. The reaction mixture was cooled to room temperature, and the obtained solution was purified through re-precipitation in methanol. The purified solution was dried under reduced pressure, to thereby produce copolymer (S-1-6).

The thus-produced copolymer (S-1-6) was found to contain a repeating unit derived from glycidyl methacrylate in an amount of 28 mol % and contain a repeating unit derived from styrene in an amount of 72 mol %. The contents of these repeating units were determined through the same method as employed in Example 1.

Next, the thus-produced copolymer (S-1-6) (1 g), thioglycerol (2.52 g), and N,N-dimethylformamide (9.45 g) were mixed together and transferred to a flask. While nitrogen was blown in the flask, the mixture was heated to 60° C. Triethylamine (9.41 g) serving as a catalyst was added to the mixture, and the mixture was allowed to react for 4 hours. The reaction mixture was cooled to room temperature. The solution was purified through re-precipitation in water and lyophilized, to thereby produce copolymer (G-1-6).

Then, the thus-produced copolymer (G-1-6) (0.1 g) was dispersed in methanol (0.862 g), and the dispersion was transferred to a flask. To the dispersion, 30% aqueous hydrogen peroxide solution (0.038 g) was added, and the mixture was allowed to react at room temperature for 18 hours. The thus-formed aqueous solution was purified through re-precipitation, to thereby produce copolymer (N-1-6) (yield: 23%). When copolymer (N-1-6) was mixed with water so as to adjust the copolymer concentration to 1 mass %, copolymer (N-1-6) was insoluble in water. However, when the copolymer concentration of 1 mass % was realized in methanol, copolymer (N-1-6) was in a dissolution state in methanol.

The produced copolymer (N-1-6) was found to have a number average molecular weight of 23,210 and a molecular weight distribution factor of 1.89.

Example 7

Synthesis of Copolymer (N-1-7)

Copolymer (N-1-7), which is a block copolymer, was produced through the following synthesis route.

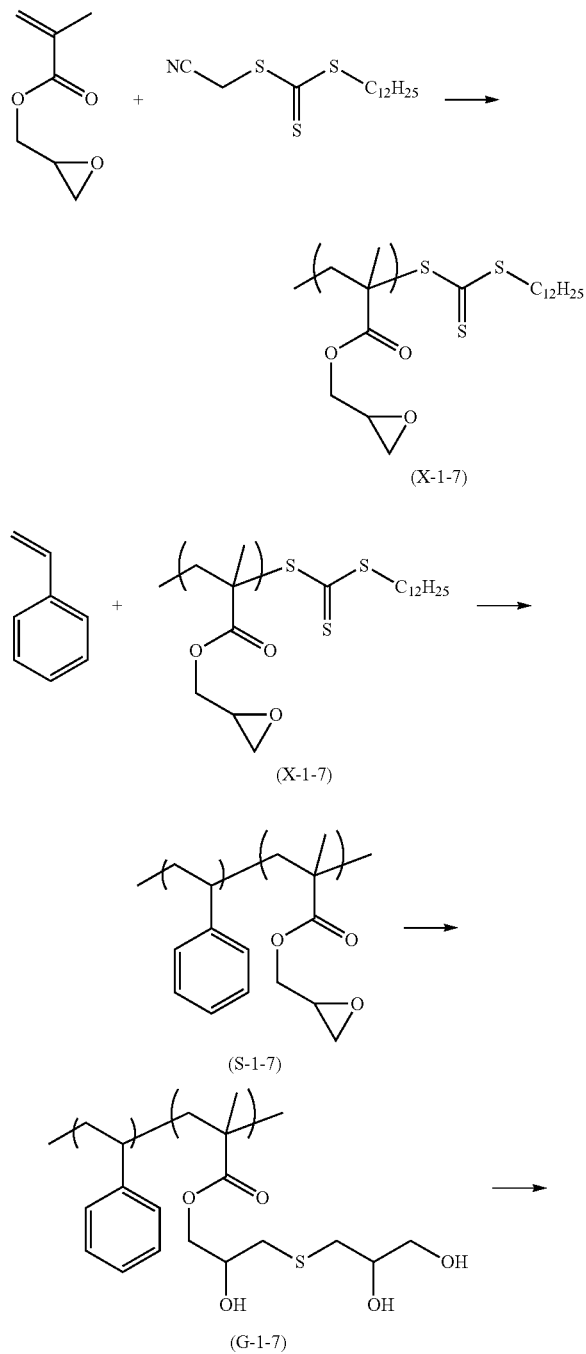

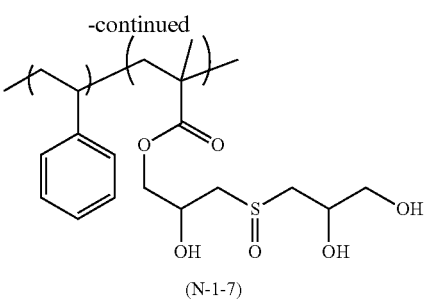

(N-1-7)

Glycidyl methacrylate (10.0 g), 2,2'-azobis(isobutyronitrile) (0.01 g) serving as a polymerization initiator, benzene serving as a solvent (18.9 g), and dodecylcyanomethyl trithiocarbonate serving as an RAFT agent (0.1 g) were mixed together and transferred to a Schlenk flask, and the flask was substituted by nitrogen through bubbling with nitrogen for 30 minutes. The mixture was then heated to 66° C. and allowed to polymerize for 35 minutes. The reaction mixture was cooled to room temperature. Thereafter, remaining solvent was removed through lyophilization, to thereby produce glycidyl methacrylate macromonomer (X-1-7).

Subsequently, the thus-produced macromonomer (X-1-7) (6.79 g), styrene (2.27 g), 2,2'-azobis(isobutyronitrile) (0.00522 g), and 1,4-dioxane serving as a solvent (12.0 g) were mixed and then the mixture was transferred to a Schlenk flask, and a freezing-evacuating cycle was repeated thrice for deoxygenation. The mixture was heated to 66° C. and allowed to polymerize for 90 minutes. The reaction mixture was cooled to room temperature. Then, the remaining solvent and unreacted monomers were removed through dialysis against water, and the purified product was lyophilized, to thereby produce glycidyl methacrylate-styrene diblock copolymer (S-1-7).

The thus-produced diblock copolymer (S-1-7) was found to contain a repeating unit derived from glycidyl methacrylate in an amount of 65 mold and contain a repeating unit derived from styrene in an amount of 35 mold. The contents of these repeating units were determined through the same method as employed in Example 1.

Next, the thus-produced copolymer (S-1-7) (1 g), thioglycerol (4.47 g), and N,N-dimethylformamide (9.45 g) were mixed together and transferred to a flask. While nitrogen was blown in the flask, the mixture was heated to 60° C. Triethylamine (16.7 g) serving as a catalyst was added to the mixture, and the mixture was allowed to react for 4 hours. The reaction mixture was cooled to room temperature. The solution was purified through re-precipitation in water and lyophilized, to thereby produce copolymer (G-1-7).

Then, the thus-produced copolymer (G-1-7) (0.1 g) was dispersed in water (0.844 g), and the dispersion was transferred to a flask. To the dispersion, 30% aqueous hydrogen peroxide solution (0.056 g) was added, and the mixture was allowed to react at room temperature for 18 hours. The thus-formed aqueous solution was dialyzed, to thereby produce copolymer (N-1-7) (yield: 10%). When copolymer (N-1-7) was mixed with water so as to adjust the copolymer concentration to 1 mass %, copolymer (N-1-7) was in a dissolution state in water.

The produced copolymer (N-1-7) was found to have a number average molecular weight of 32,500 and a molecular weight distribution factor of 1.20.

The structure of copolymer (N-1-7) was confirmed through $^{13}$C-NMR.

Example 8

Synthesis of Copolymer (N-1-8)

Copolymer (N-1-8), which is a graft copolymer, was produced through the following synthesis route.

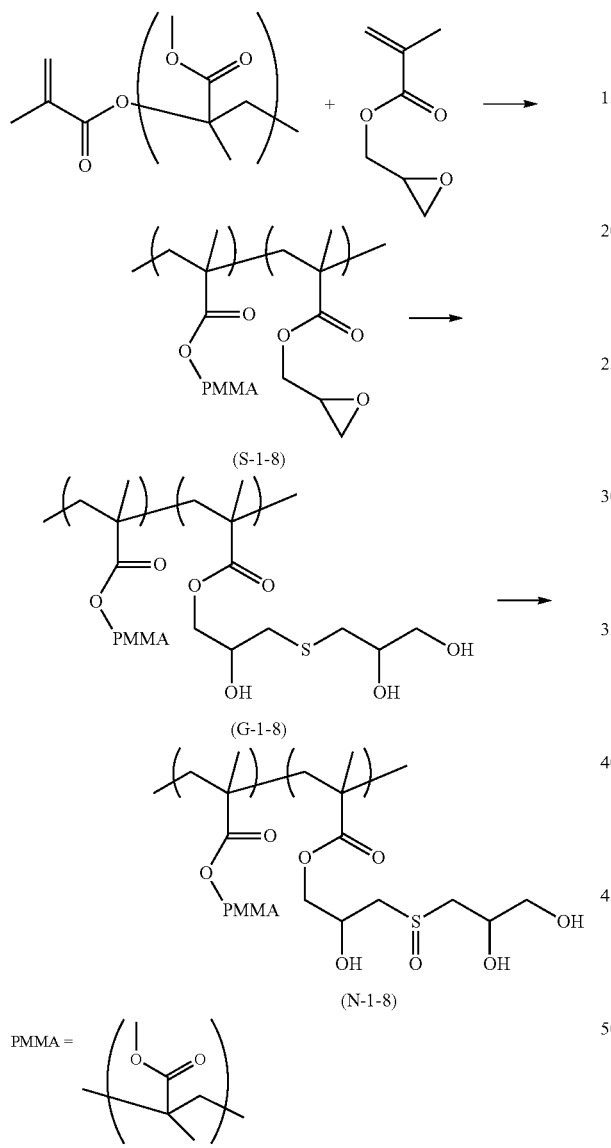

Glycidyl methacrylate (27.5 g), a polymethyl methacrylate macromonomer having a methacryloyloxy group at an end thereof (Macromonomer AA-6, product of Toagosei Co., Ltd., molecular weight: 6,000) (0.486 g), 2,2'-azobis (isobutyronitrile) serving as a polymerization initiator (0.280 g), and N-methylpyrrolidone (66.0 g) were mixed together and transferred to a flask. While nitrogen was blown in the flask, the mixture was heated to 70° C. and allowed to polymerize for 8 hours. The reaction mixture was cooled to room temperature, to thereby produce a solution of copolymer (S-1-8).

The thus-produced copolymer (S-1-8) was found to contain a repeating unit derived from glycidyl methacrylate in an amount of 99 mol % and contain a repeating unit derived from the macromonomer in an amount of 1 mol %. The contents of these repeating units were determined through the same method as employed in Example 1.

Next, the thus-produced copolymer (S-1-8) solution (10.0 g), thioglycerol (11.1 g), and methanol (4.83 g) were mixed together and transferred to a flask. While nitrogen was blown in the flask, the mixture was heated to 60° C. Triethylamine (0.416 g) serving as a catalyst was added to the mixture, and the mixture was allowed to react for 2 hours. The reaction mixture was cooled to room temperature. The solution was purified through re-precipitation in water, to thereby produce copolymer (G-1-8).

Then, the thus-produced copolymer (G-1-8) (2.13 g) was dissolved in a mixture of water (4.30 g) and methanol (3.55 g), and the solution was transferred to a flask. To the solution, 30% aqueous hydrogen peroxide solution (1.43 g) was added, and the mixture was allowed to react at 40° C. for 2 hours. The thus-formed aqueous solution was dialyzed, to thereby produce copolymer (N-1-8) (yield: 31%). When copolymer (N-1-8) was mixed with water so as to adjust the copolymer concentration to 1 mass %, copolymer (N-1-8) was in a dissolution state in water.

The produced copolymer (N-1-8) was found to have a number average molecular weight of 69,600 and a molecular weight distribution factor of 3.04.

The structure of copolymer (N-1-8) was confirmed through $^{13}$C-NMR.

Example 9

Synthesis of Copolymer (N-1-9)

Copolymer (N-1-9), which is a graft copolymer, was produced through the following synthesis route.

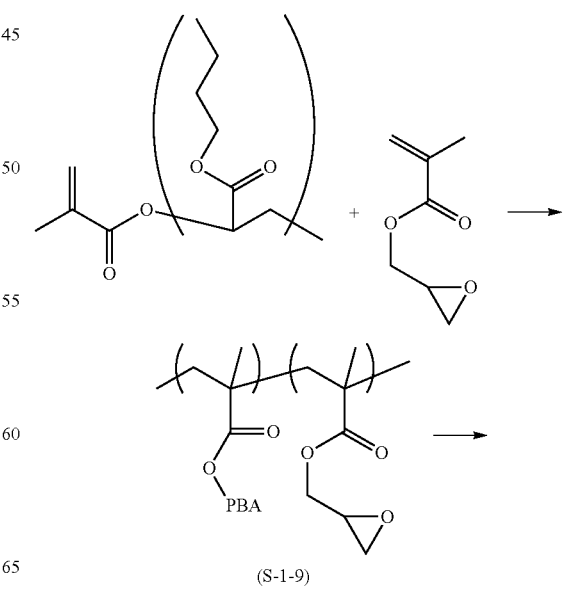

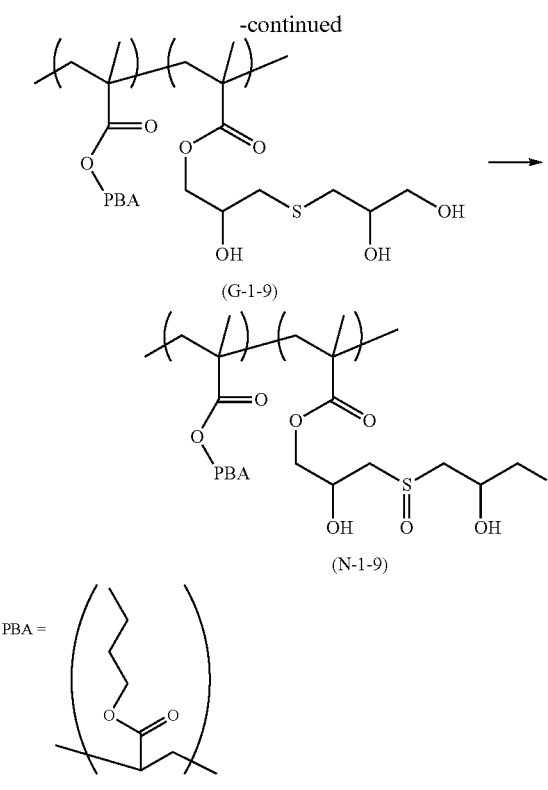

(G-1-9)

(N-1-9)

PBA =

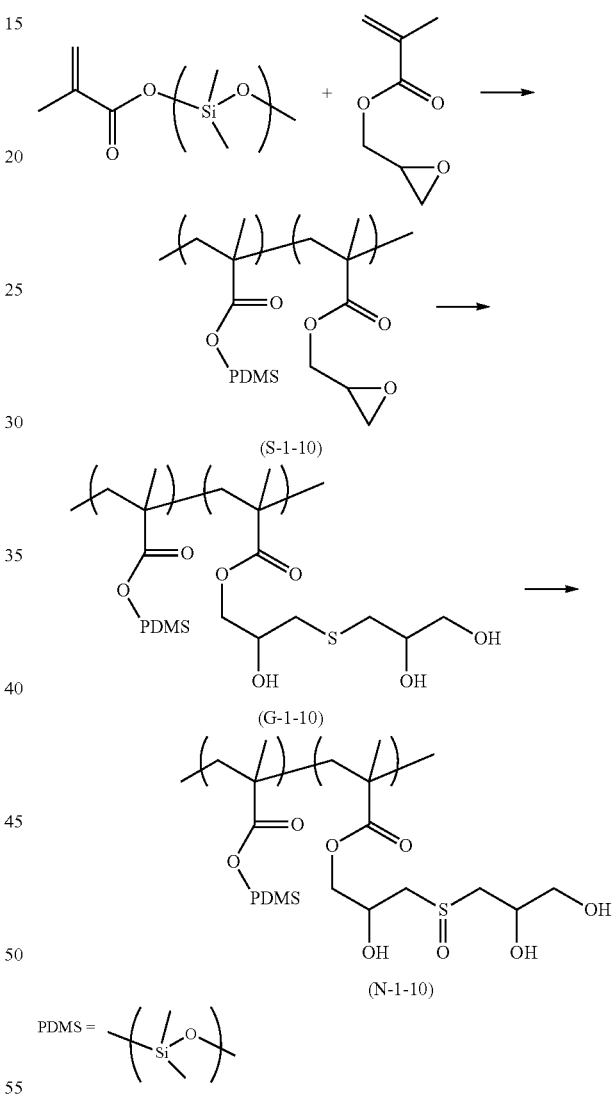

(S-1-10)

(G-1-10)

(N-1-10)

PDMS =

Glycidyl methacrylate (27.5 g), a polybutyl acrylate macromonomer having a methacryloyloxy group at an end thereof (Macromonomer AB-6, product of Toagosei Co., Ltd., molecular weight: 6,000) (0.486 g), 2,2'-azobis(isobutyronitrile) serving as a polymerization initiator (0.280 g), and N-methylpyrrolidone (66.0 g) were mixed together and transferred to a flask. While nitrogen was blown in the flask, the mixture was heated to 70° C. and allowed to polymerize for 8 hours. The reaction mixture was cooled to room temperature, to thereby produce a solution of copolymer (S-1-9).

The thus-produced copolymer (S-1-9) was found to contain a repeating unit derived from glycidyl methacrylate in an amount of 99 mol % and contain a repeating unit derived from the macromonomer in an amount of 1 mol %. The contents of these repeating units were determined through the same method as employed in Example 1.

Next, the thus-produced copolymer (S-1-9) solution (10.0 g), thioglycerol (11.1 g), and methanol (4.83 g) were mixed together and transferred to a flask. While nitrogen was blown in the flask, the mixture was heated to 60° C. Triethylamine (0.416 g) serving as a catalyst was added to the mixture, and the mixture was allowed to react for 2 hours. The reaction mixture was cooled to room temperature. The solution was purified through re-precipitation in water, to thereby produce copolymer (G-1-9).

Then, the thus-produced copolymer (G-1-9) (2.10 g) was dissolved in a mixture of water (5.80 g) and methanol (3.49 g), and the solution was transferred to a flask. To the solution, 30% aqueous hydrogen peroxide solution (1.40 g) was added, and the mixture was allowed to react at 40° C. for 2 hours. The thus-formed aqueous solution was dialyzed, to thereby produce copolymer (N-1-9) (yield: 27%). When copolymer (N-1-9) was mixed with water so as to adjust the copolymer concentration to 1 mass %, copolymer (N-1-9) was in a dissolution state in water.

The produced copolymer (N-1-9) was found to have a number average molecular weight of 64,300 and a molecular weight distribution factor of 2.94.

The structure of copolymer (N-1-9) was confirmed through $^{13}$C-NMR.

Example 10

Synthesis of Copolymer (N-1-10)

Copolymer (N-1-10), which is a graft copolymer, was produced through the following synthesis route.

Glycidyl methacrylate (11.3 g), a polydimethylsiloxane macromonomer having a methacryloyloxy group at an end thereof (modified silicone oil X-22-2475, product of Shin-Etsu Chemical Co., Ltd., molecular weight: 420) (3.75 g), 2,2'-azobis(isobutyronitrile) serving as a polymerization initiator (0.150 g), and ethyl acetate (35.4 g) were mixed together and transferred to a flask. While nitrogen was blown in the flask, the mixture was heated to 70° C. and allowed to polymerize for 8 hours. The reaction mixture was cooled to room temperature, to thereby produce a solution of copolymer (S-1-10).

The thus-produced copolymer (S-1-10) was found to contain a repeating unit derived from glycidyl methacrylate in an amount of 90 mol % and contain a repeating unit derived from the macromonomer in an amount of 10 mol %. The contents of these repeating units were determined through the same method as employed in Example 1.

Next, the thus-produced copolymer (S-1-10) solution (16.0 g), thioglycerol (13.6 g), and methanol (7.72 g) were mixed together and transferred to a flask. While nitrogen was blown in the flask, the mixture was heated to 60° C. Triethylamine (0.508 g) serving as a catalyst was added to the mixture, and the mixture was allowed to react for 2 hours. The reaction mixture was cooled to room temperature. The solution was purified through re-precipitation in water, to thereby produce copolymer (G-1-10).

Then, the thus-produced copolymer (G-1-10) (2.03 g) was dissolved in a mixture of water (3.85 g) and methanol (3.53 g), and the solution was transferred to a flask. To the solution, 30% aqueous hydrogen peroxide solution (1.16 g) was added, and the mixture was allowed to react at 40° C. for 2 hours. The thus-formed aqueous solution was dialyzed, to thereby produce copolymer (N-1-10) (yield: 21%). When copolymer (N-1-10) was mixed with water so as to adjust the copolymer concentration to 1 mass %, copolymer (N-1-10) was in a dissolution state in water.

The produced copolymer (N-1-10) was found to have a number average molecular weight of 53,400 and a molecular weight distribution factor of 2.12.

The structure of copolymer (N-1-10) was confirmed through $^{13}$C-NMR.

Example 11

Synthesis of Copolymer (N-1-11)

Copolymer (N-1-11) was produced through the following synthesis route.

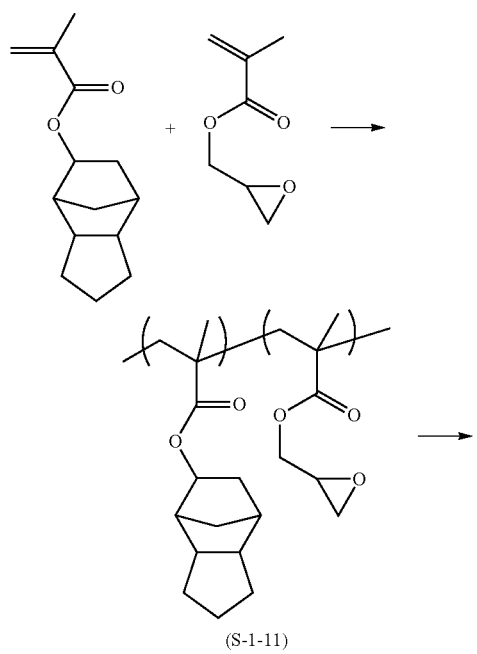

Glycidyl methacrylate (24.0 g), tricyclo[5.2.1.0$^{2,6}$]decan-8-yl methacrylate (8.00 g), 2,2'-azobis(isobutyronitrile) (0.320 g) serving as a polymerization initiator, and N-methylpyrrolidone (75.5 g) were mixed together and transferred to a flask. While nitrogen was blown in the flask, the mixture was heated to 70° C. and allowed to polymerize for 8 hours. The reaction mixture was cooled to room temperature, to thereby produce a solution of copolymer (S-1-11).

The thus-produced copolymer (S-1-11) was found to contain a repeating unit derived from glycidyl methacrylate in an amount of 82 mol % and contain a repeating unit derived from tricyclo[5.2.1.0$^{2,6}$]decan-8-yl methacrylate in an amount of 18 mol %. The contents of these repeating units were determined through the same method as employed in Example 1.

Next, the thus-produced copolymer solution (S-1-11) (16.0 g), thioglycerol (13.6 g), and methanol (7.72 g) were mixed together and transferred to a flask. While nitrogen was blown in the flask, the mixture was heated to 60° C. Triethylamine (0.508 g) serving as a catalyst was added to the mixture, and the mixture was allowed to react for 2 hours. The reaction mixture was cooled to room temperature. The solution was purified through re-precipitation in water, to thereby produce copolymer (G-1-11).

Then, the thus-produced copolymer (G-1-11) (2.70 g) was dissolved in a mixture of water (8.88 g) and methanol (10.5 g), and the solution was transferred to a flask. To the solution, 30% aqueous hydrogen peroxide solution (1.51 g) was added, and the mixture was allowed to react at 40° C. for 2 hours. The thus-formed aqueous solution was dialyzed, to thereby produce copolymer (N-1-11) (yield: 32%). When copolymer (N-1-11) was mixed with water so as to adjust the copolymer concentration to 1 mass %, copolymer (N-1-11) was in a dissolution state in water.

The produced copolymer (N-1-11) was found to have a number average molecular weight of 60,500 and a molecular weight distribution factor of 2.63.

The structure of copolymer (N-1-11) was confirmed through $^{13}$C-NMR.

Example 12

Synthesis of Copolymer (N-1-12)

Copolymer (N-1-12) was produced through the following synthesis route.

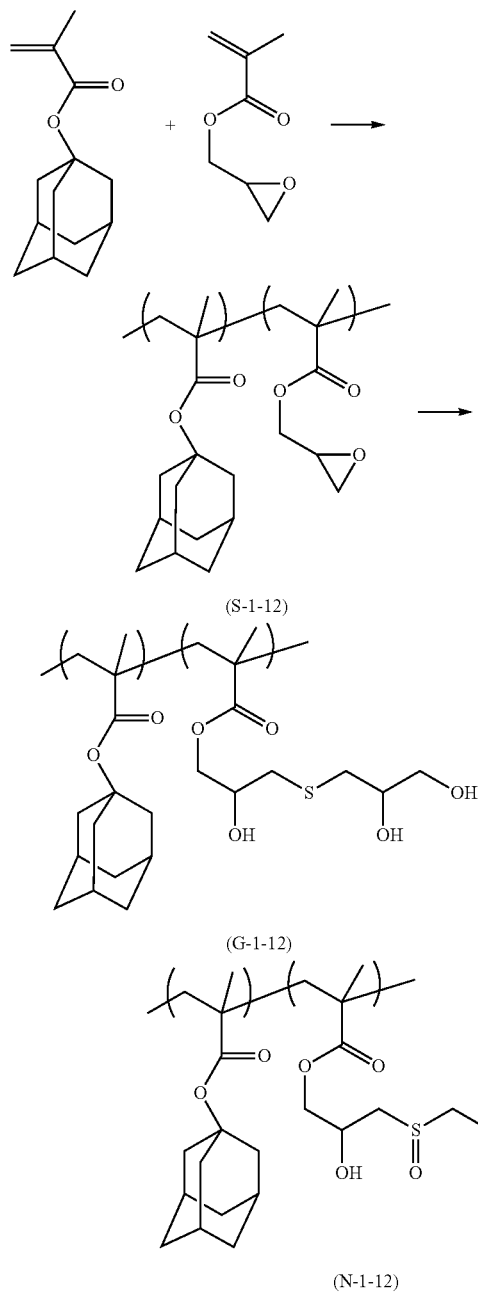

Glycidyl methacrylate (11.3 g), 1-adamantyl methacrylate (3.75 g), 2,2'-azobis(isobutyronitrile) (0.150 g) serving as a polymerization initiator, and N-methylpyrrolidone (35.4 g) were mixed together and transferred to a flask. While nitrogen was blown in the flask, the mixture was heated to 70° C. and allowed to polymerize for 8 hours. The reaction mixture was cooled to room temperature, to thereby produce a solution of copolymer (S-1-12).

The thus-produced copolymer (S-1-12) was found to contain a repeating unit derived from glycidyl methacrylate in an amount of 82 mol % and contain a repeating unit derived from 1-adamantyl methacrylate in an amount of 18 mol %. The contents of these repeating units were determined through the same method as employed in Example 1.

Next, the thus-produced copolymer (S-1-12) solution (16.0 g), thioglycerol (13.6 g), and methanol (7.72 g) were mixed together and transferred to a flask. While nitrogen was blown in the flask, the mixture was heated to 60° C. Triethylamine (0.508 g) serving as a catalyst was added to the mixture, and the mixture was allowed to react for 2 hours. The reaction mixture was cooled to room temperature. The solution was purified through re-precipitation in water, thereby produce copolymer (G-1-12).

Then, the thus-produced copolymer (G-1-12) (2.19 g) was dissolved in a mixture of water (3.31 g) and methanol (4.66 g), and the solution was transferred to a flask. To the solution, 30% aqueous hydrogen peroxide solution (1.24 g) was added, and the mixture was allowed to react at 40° C. for 2 hours. The thus-formed aqueous solution was dialyzed, to thereby produce copolymer (N-1-12) (yield: 35%). When copolymer (N-1-12) was mixed with water so as to adjust the copolymer concentration to 1 mass %, copolymer (N-1-12) was in a dissolution state in water.

The produced copolymer (N-1-12) was found to have a number average molecular weight of 99,800 and a molecular weight distribution factor of 2.49.

The structure of copolymer (N-1-12) was confirmed through $^{13}$C-NMR.

Example 13

Synthesis of Copolymer (N-1-13)

Copolymer (N-1-13) was produced through the following synthesis route.

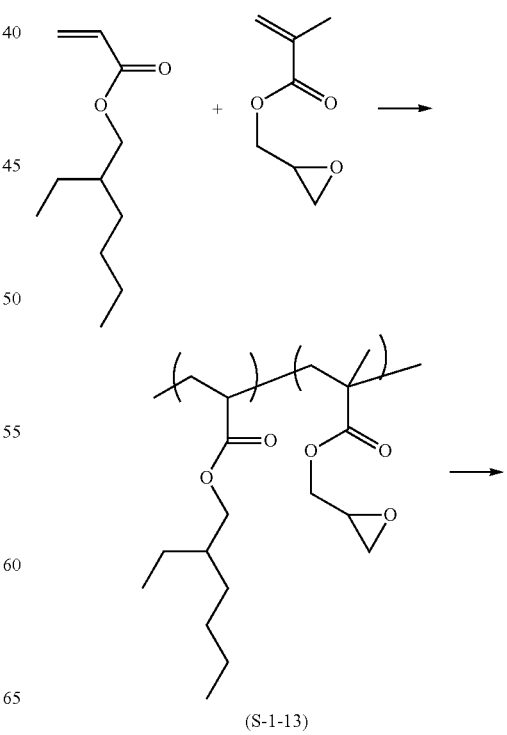

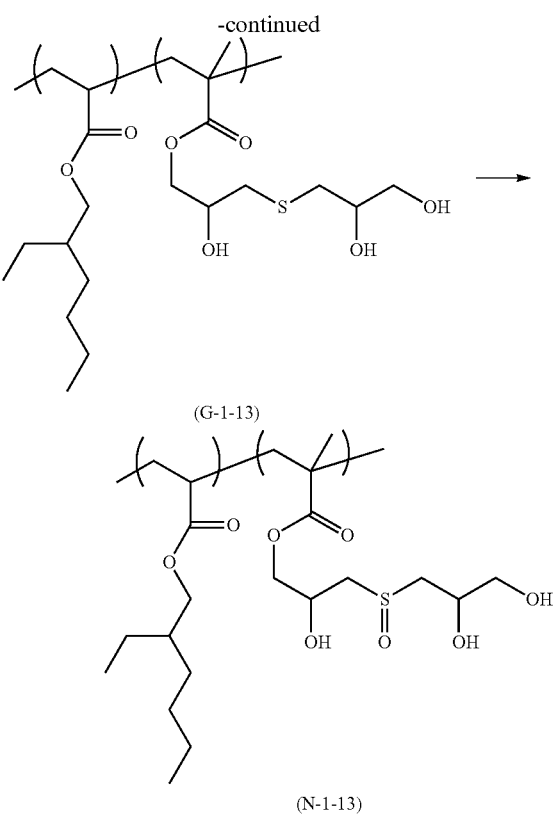

(G-1-13)

(N-1-13)

Glycidyl methacrylate (20.2 g), 2-ethylhexyl acrylate (6.81 g), 2,2'-azobis(isobutyronitrile) (0.272 g) serving as a polymerization initiator, and N-methylpyrrolidone (60.7 g) were mixed together and transferred to a flask. While nitrogen was blown in the flask, the mixture was heated to 70° C. and allowed to polymerize for 8 hours. The reaction mixture was cooled to room temperature, to thereby produce a solution of copolymer (S-1-13).

The thus-produced copolymer (S-1-13) was found to contain a repeating unit derived from glycidyl methacrylate in an amount of 80 mol % and contain a repeating unit derived from 2-ethylhexyl acrylate in an amount of 20 mol %. The contents of these repeating units were determined through the same method as employed in Example 1.

Next, the thus-produced copolymer (S-1-13) solution (16.0 g), thioglycerol (13.6 g), and methanol (7.72 g) were mixed together and transferred to a flask. While nitrogen was blown in the flask, the mixture was heated to 60° C. Triethylamine (0.508 g) serving as a catalyst was added to the mixture, and the mixture was allowed to react for 2 hours. The reaction mixture was cooled to room temperature. The solution was purified through re-precipitation in water, to thereby produce copolymer (G-1-13).

Then, the thus-produced copolymer (G-1-13) (3.30 g) was dissolved in a mixture of water (8.03 g) and methanol (9.10 g), and the solution was transferred to a flask. To the solution, 30% aqueous hydrogen peroxide solution (1.87 g) was added, and the mixture was allowed to react at 40° C. for 2 hours. The thus-formed aqueous solution was dialyzed, to thereby produce copolymer (N-1-13) (yield: 41%). When copolymer (N-1-13) was mixed with water so as to adjust the copolymer concentration to 1 mass %, copolymer (N-1-13) was in a dissolution state in water.

The produced copolymer (N-1-13) was found to have a number average molecular weight of 69,300 and a molecular weight distribution factor of 2.08.

The structure of copolymer (N-1-13) was confirmed through $^{13}$C-NMR.

Example 14

Synthesis of Copolymer (N-1-14)

Copolymer (N-1-14) was produced through the following synthesis route.

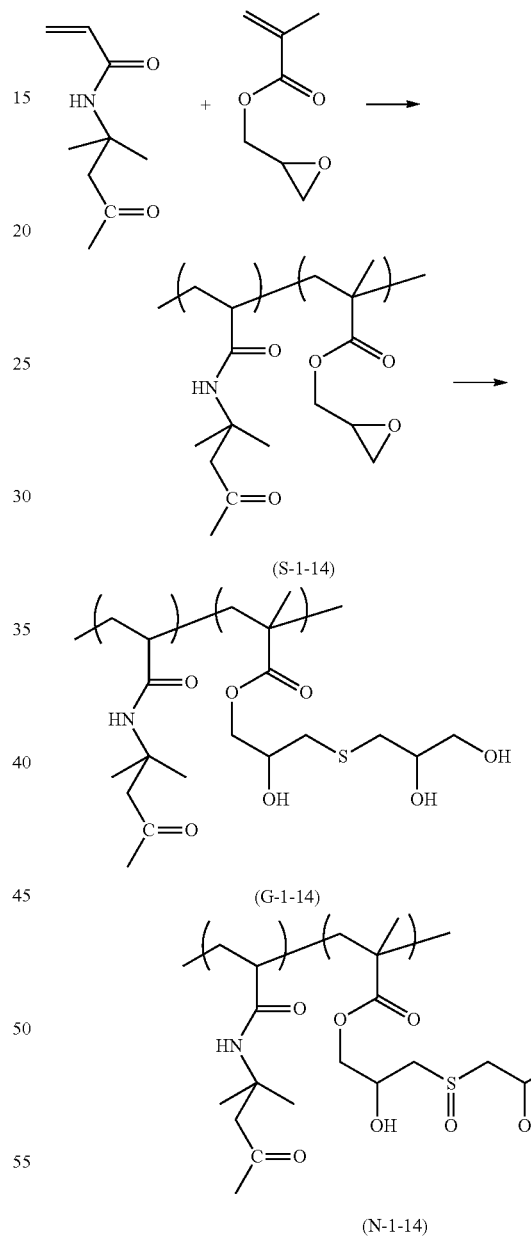

(S-1-14)

(G-1-14)

(N-1-14)

Glycidyl methacrylate (6.57 g), N-(1,1-dimethyl-2-acetylethyl)acrylamide (5.00 g), 2,2'-azobis(isobutyronitrile) (0.116 g) serving as a polymerization initiator, and N-methylpyrrolidone (45.0 g) were mixed together and transferred to a flask. While nitrogen was blown in the flask, the mixture was heated to 70° C. and allowed to polymerize for 8 hours. The reaction mixture was cooled to room temperature, to thereby produce a solution of copolymer (S-1-14).

The thus-produced copolymer (S-1-14) was found to contain a repeating unit derived from glycidyl methacrylate in an amount of 61 mol % and contain a repeating unit derived from N-(1,1-dimethyl-2-acetylethyl)acrylamide in an amount of 39 mol %. The contents of these repeating units were determined through the same method as employed in Example 1.

Next, the thus-produced copolymer (S-1-14) solution (25.0 g), thioglycerol (11.0 g), and methanol (5.52 g) were mixed together and transferred to a flask. While nitrogen was blown in the flask, the mixture was heated to 60° C. Triethylamine (0.413 g) serving as a catalyst was added to the mixture, and the mixture was allowed to react for 2 hours. The reaction mixture was cooled to room temperature. The solution was purified through re-precipitation in water, to thereby produce copolymer (G-1-14).

Then, the thus-produced copolymer (G-1-14) (2.42 g) was dissolved in a mixture of water (2.27 g) and methanol (5.07 g), and the solution was transferred to a flask. To the solution, 30% aqueous hydrogen peroxide solution (1.15 g) was added, and the mixture was allowed to react at 40° C. for 2 hours. The thus-formed aqueous solution was dialyzed, thereby produce copolymer (N-1-14) (yield: 23%). When copolymer (N-1-14) was mixed with water so as to adjust the copolymer concentration to 1 mass %, copolymer (N-1-14) was in a dissolution state in water.

The produced copolymer (N-1-14) was found to have a number average molecular weight of 36,300 and a molecular weight distribution factor of 1.90.

The structure of copolymer (N-1-14) was confirmed through $^{13}$C-NMR.

Example 15

Synthesis of Copolymer (N-1-15)

Copolymer (N-1-15) was produced through the following synthesis route.

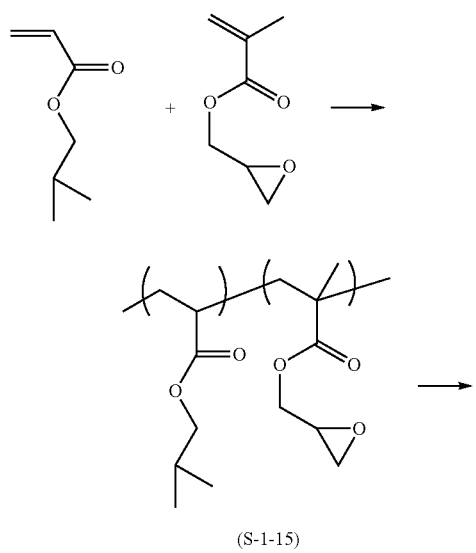

(S-1-15)

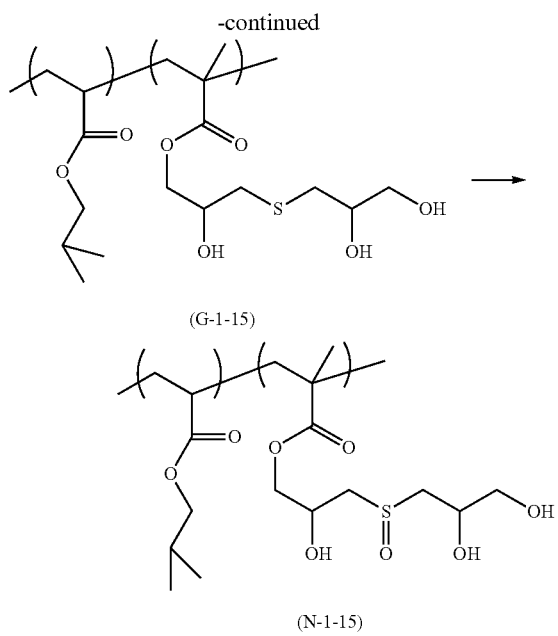

(G-1-15)

(N-1-15)

Glycidyl methacrylate (22.5 g), isobutyl acrylate (7.49 g), 2,2'-azobis(isobutyronitrile) (0.300 g) serving as a polymerization initiator, and N-methylpyrrolidone (70.7 g) were mixed together and transferred to a flask. While nitrogen was blown in the flask, the mixture was heated to 70° C. and allowed to polymerize for 8 hours. The reaction mixture was cooled to room temperature, to thereby produce a solution of copolymer (S-1-15).

The thus-produced copolymer (S-1-15) was found to contain a repeating unit derived from glycidyl methacrylate in an amount of 73 mol % and contain a repeating unit derived from isobutyl acrylate in an amount of 27 mol %. The contents of the repeating units were determined through the same method as employed in Example 1.

Next, the thus-produced copolymer (S-1-15) solution (16.0 g), thioglycerol (13.6 g), and methanol (7.72 g) were mixed together and transferred to a flask. While nitrogen was blown in the flask, the mixture was heated to 60° C. Triethylamine (0.508 g) serving as a catalyst was added to the mixture, and the mixture was allowed to react for 2 hours. The reaction mixture was cooled to room temperature. The solution was purified through re-precipitation in water, to thereby produce copolymer (G-1-15).

Then, the thus-produced copolymer (G-1-15) (1.85 g) was dissolved in a mixture of water (5.24 g) and methanol (6.39 g), and the solution was transferred to a flask. To the solution, 30% aqueous hydrogen peroxide solution (1.05 g) was added, and the mixture was allowed to react at 40° C. for 2 hours. The thus-formed aqueous solution was dialyzed, thereby produce copolymer (N-1-15) (yield: 22%). When copolymer (N-1-15) was mixed with water so as to adjust the copolymer concentration to 1 mass %, copolymer (N-1-15) was in a dissolution state in water.

The produced copolymer (N-1-15) was found to have a number average molecular weight of 66,700 and a molecular weight distribution factor of 2.24.

The structure of copolymer (N-1-15) was confirmed through $^{13}$C-NMR.

Example 16

Synthesis of Copolymer (N-1-16)

Copolymer (N-1-16) was produced through the following synthesis route.

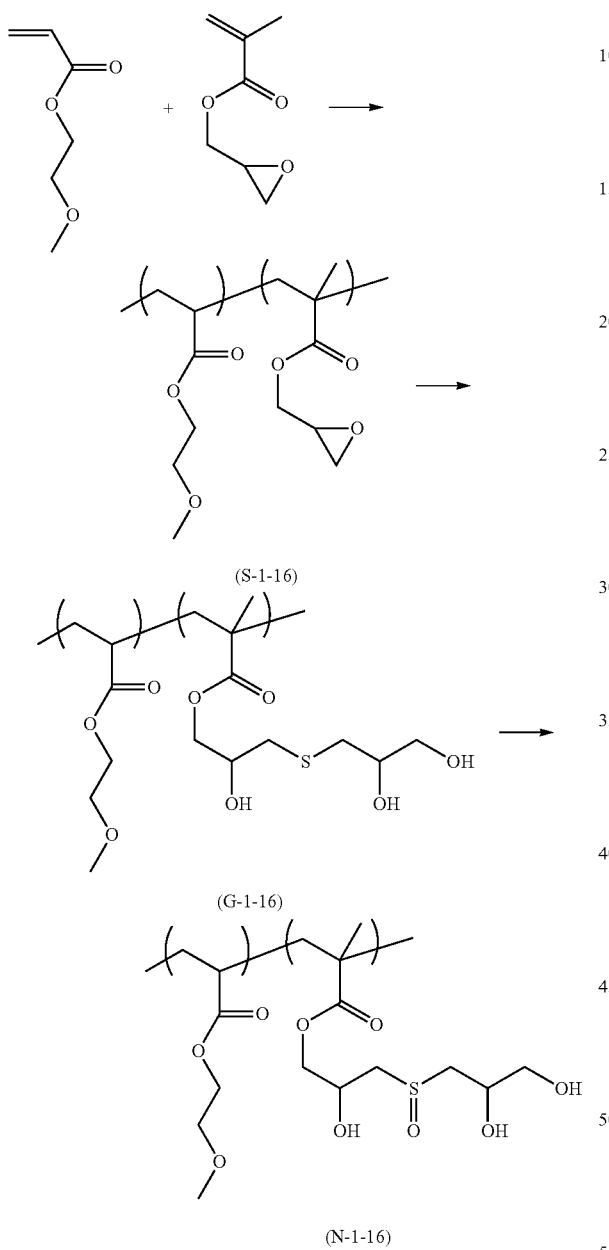

Glycidyl methacrylate (22.5 g), 2-methoxyethyl acrylate (7.49 g), 2,2'-azobis(isobutyronitrile) (0.300 g) serving as a polymerization initiator, and N-methylpyrrolidone (70.7 g) were mixed together and transferred to a flask. While nitrogen was blown in the flask, the mixture was heated to 70° C. and allowed to polymerize for 8 hours. The reaction mixture was cooled to room temperature, to thereby produce a solution of copolymer (S-1-16).

The thus-produced copolymer (S-1-16) was found to contain a repeating unit derived from glycidyl methacrylate in an amount of 73 mol % and contain a repeating unit derived from 2-methoxyethyl acrylate in an amount of 27 mol %. The contents of these repeating units were determined through the same method as employed in Example 1.

Next, the thus-produced copolymer (S-1-16) solution (16.0 g), thioglycerol (13.6 g), and methanol (7.72 g) were mixed together and transferred to a flask. While nitrogen was blown in the flask, the mixture was heated to 60° C. Triethylamine (0.508 g) serving as a catalyst was added to the mixture, and the mixture was allowed to react for 2 hours. The reaction mixture was cooled to room temperature. The solution was purified through re-precipitation in water, to thereby produce copolymer (G-1-16).

Then, the thus-produced copolymer (G-1-16) (2.01 g) was dissolved in a mixture of water (4.83 g) and methanol (4.29 g), and the solution was transferred to a flask. To the solution, 30% aqueous hydrogen peroxide solution (1.14 g) was added, and the mixture was allowed to react at 40° C. for 2 hours. The thus-formed aqueous solution was dialyzed, to thereby produce copolymer (N-1-16) (yield: 25%). When copolymer (N-1-16) was mixed with water so as to adjust the copolymer concentration to 1 mass %, copolymer (N-1-16) was in a dissolution state in water.

The produced copolymer (N-1-16) was found to have a number average molecular weight of 40,100 and a molecular weight distribution factor of 2.54.

The structure of copolymer (N-1-16) was confirmed through $^{13}$C-NMR.

Example 17

Synthesis of Copolymer (N-1-17)

Copolymer (N-1-17) was produced through the following synthesis route.

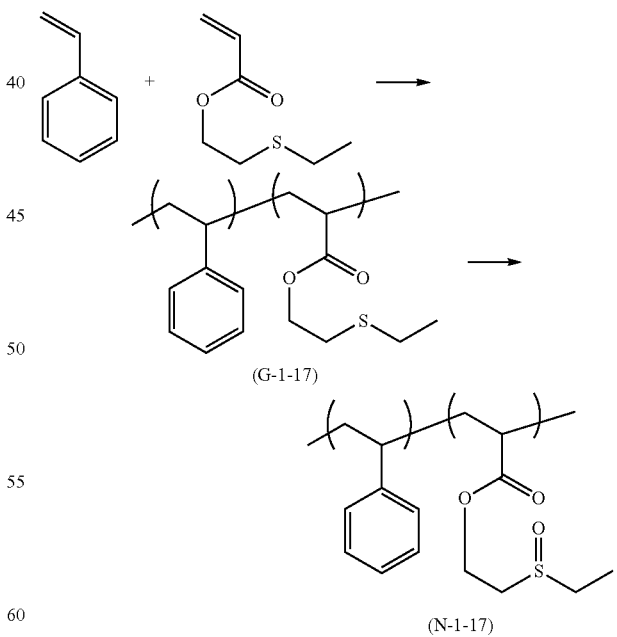

2-(Ethylthio)ethyl acrylate (1.60 g), styrene (0.016 g), 2,2'-azobis(isobutyronitrile) serving as a polymerization initiator (0.012 g), and ethyl acetate (6.46 g) were mixed together and transferred to a flask. While nitrogen was blown in the flask, the mixture was heated to 70° C. and allowed to polymerize for 8 hours. The reaction mixture was cooled to room temperature, and purified through re-precipitation in water, to thereby produce copolymer (G-1-17).

The thus-produced copolymer (G-1-17) was found to contain a repeating unit derived from 2-(ethylthio)ethyl acrylate in an amount of 99 mol % and contain a repeating unit derived from styrene in an amount of 1 mol %. The contents of these repeating units were determined through the same method as employed in Example 1.

Then, the thus-produced copolymer (G-1-17) (0.300 g) was dissolved in a mixture of water (1.5 g) and methanol (1.5 g), and the solution was transferred to a flask. To the solution, 30% aqueous hydrogen peroxide solution (0.318 g) was added, and the mixture was allowed to react at 40° C. for 2 hours. The thus-formed aqueous solution was dialyzed, to thereby produce copolymer (N-1-17) (yield: 30%). When copolymer (N-1-17) was mixed with water so as to adjust the copolymer concentration to 1 mass %, copolymer (N-1-17) was in a dissolution state in water.

The produced copolymer (N-1-17) was found to have a number average molecular weight of 39,400 and a molecular weight distribution factor of 2.98.

The structure of copolymer (N-1-17) was confirmed through $^{13}$C-NMR.

Table 1 shows HLB values (Oda's equation) of copolymers (N-1-1) to (N-1-17) produced in Examples 1 to 17. Separately, a hompolymer was produced from the repeating unit (A) of each of copolymers (N-1-1) to (N-1-17). When the homopolymer (1 g) was added to pure water (100 g), the homopolymer was dissolved at ambient temperature (25° C.) Also, a homopolymer was produced from the repeating unit (B) of each of copolymers (N-1-1) to (N-1-17). When the homopolymer (1 g) was added to pure water (100 g), the homopolymer was not completely dissolved at ambient temperature (25° C.).

TABLE 1

|  | HLB of compound | HLB of repeating unit (A) | HLB of repeating unit (B) |
|---|---|---|---|
| Copolymer (N-1-1) | 18.9 | 21.3 | 0.9 |
| Copolymer (N-1-2) | 12.4 | 16.0 | 0.9 |
| Copolymer (N-1-3) | 12.2 | 16.0 | 0.9 |
| Copolymer (N-1-4) | 17.6 | 23.8 | 0.9 |
| Copolymer (N-1-5) | 12.8 | 23.8 | 0.9 |
| Copolymer (N-1-6) | 8.7 | 23.8 | 0.9 |
| Copolymer (N-1-7) | 17.2 | 23.8 | 0.9 |
| Copolymer (N-1-8) | 17.1 | 23.8 | 6.7 |
| Copolymer (N-1-9) | 16.6 | 23.8 | 4.3 |
| Copolymer (N-1-10) | 20.9 | 23.8 | 4.2 |
| Copolymer (N-1-11) | 19.6 | 23.8 | 4.8 |
| Copolymer (N-1-12) | 20.5 | 23.8 | 5.9 |
| Copolymer (N-1-13) | 19.6 | 23.8 | 2.9 |
| Copolymer (N-1-14) | 21.4 | 23.8 | 16.6 |
| Copolymer (N-1-15) | 20.2 | 23.8 | 4.6 |
| Copolymer (N-1-16) | 20.8 | 23.8 | 6.7 |
| Copolymer (N-1-17) | 11.0 | 11.1 | 0.9 |

Test Example 1

Measurement of the Amount of Adsorbed Antibody (1)

A 1 mass % aqueous solution of each of the copolymers produced in Examples 1 to 5 was poured to a 96-well plate made of polystyrene and incubated at room temperature for 5 minutes. The plate was washed thrice with ultra-pure water. Subsequently, an aqueous solution of a horse radish peroxidase-labeled mouse IgG antibody (AP124P, product of Millipore Corporation) was added to the 96-well plate, and incubation was performed at room temperature for one hour. The plate was washed thrice with PBS buffer. The plate was subjected to color development with TMB (3,3',5,5'-tetramethylbendidine)/aqueous hydrogen peroxide/sulfuric acid, and absorbance was measured at 450 nm. A calibration curve was drawn from the measured absorbance values, and the amount of adsorbed antibody was calculated by the calibration curve.

As a control sample, the amount of adsorbed antibody was calculated in the same manner except that each of plates was not treated with 1 mass % aqueous solution of each of the copolymers produced in Examples 1 to 5.

Table 2 shows the results of Test Example 1.

TABLE 2

|  | Repeating unit (A) content | | Repeating unit (B) content | | Adsorbed antibody amount (ng) |
|---|---|---|---|---|---|
|  | (mol %) | (mass %) | (mol %) | (mass %) |  |
| Control | — | — | — | — | 3.67 |
| Copolymer (N-1-1) | 80 | 94 | 20 | 6 | 1.37 |
| Copolymer (N-1-2) | 62 | 83 | 38 | 17 | 0.13 |
| Copolymer (N-1-3) | 61 | 83 | 39 | 17 | 0.12 |
| Copolymer (N-1-4) | 67 | 84 | 33 | 16 | 0.03 |
| Copolymer (N-1-5) | 45 | 68 | 55 | 32 | 0.15 |

Test Example 2

Measurement of the Amount of Adsorbed Antibody (2)

The procedure of Test Example 1 was repeated, except that a 0.1 mass % aqueous solution of each of the copolymers produced in Examples 1 to 5 and 7 to 17 was used. The amount of adsorbed antibody was calculated through a technique by use of a calibration curve.

Table 3 shows the results of Test Example 2.

TABLE 3

|  | Repeating unit (A) content | | Repeating unit (B) content | | Adsorbed antibody amount (ng) |
|---|---|---|---|---|---|
|  | (mol %) | (mass %) | (mol %) | (mass %) |  |
| Control | — | — | — | — | 3.82 |
| Copolymer (N-1-1) | 80 | 94 | 20 | 6 | 1.25 |
| Copolymer (N-1-2) | 62 | 83 | 38 | 17 | 0.10 |
| Copolymer (N-1-3) | 61 | 83 | 39 | 17 | 0.11 |
| Copolymer (N-1-4) | 67 | 84 | 33 | 16 | 0.03 |
| Copolymer (N-1-5) | 45 | 68 | 55 | 32 | 0.16 |
| Copolymer (N-1-7) | 65 | 83 | 35 | 17 | 0.01 |
| Copolymer (N-1-8) | 99 | 81 | 1 | 19 | 1.30 |
| Copolymer (N-1-9) | 99 | 81 | 1 | 19 | 1.29 |
| Copolymer (N-1-10) | 90 | 85 | 10 | 15 | 0.52 |
| Copolymer (N-1-11) | 82 | 85 | 18 | 15 | 0.17 |
| Copolymer (N-1-12) | 82 | 85 | 18 | 15 | 0.07 |
| Copolymer (N-1-13) | 80 | 85 | 20 | 15 | 0.03 |
| Copolymer (N-1-14) | 61 | 71 | 39 | 29 | 0.02 |
| Copolymer (N-1-15) | 73 | 85 | 27 | 15 | 0.02 |
| Copolymer (N-1-16) | 73 | 85 | 27 | 15 | 0.40 |
| Copolymer (N-1-17) | 99 | 99 | 1 | 1 | 0.32 |

As shown in Tables 2 and 3, copolymers (N-1-1) to (N-1-5) and (N-1-7) to (N-1-17) exhibited excellent non-specific adsorption inhibitory effect.

Test Example 3

Contact Angle Measurement (1)

A polystyrene substrate was dipped in a 1 mass % aqueous solution of each of the copolymers produced in Examples 1 to 5 at room temperature for 5 minutes. The polyethylene substrate was washed thrice with ultra-pure water. Only in the case of the polymer obtained in Example 6, the polymer was dissolved in methanol to a polymer concentration of 10 mass %, and the solution was applied onto a polystyrene substrate, followed by drying. The contact angle between water and the polystyrene substrate was measured. A polystyrene substrate which had not been treated with the polymer was employed as a control sample, and contact angle was measured in the same manner.

Table 4 shows the results of Test Example

TABLE 4

|  | Repeating unit (A) content | | Repeating unit (B) content | | |
|---|---|---|---|---|---|
|  | (mol %) | (mass %) | (mol %) | (mass %) | Contact angle (°) |
| Control | — | — | — | — | 83.8 |
| Copolymer (N-1-1) | 80 | 94 | 20 | 6 | 69.5 |
| Copolymer (N-1-2) | 62 | 83 | 38 | 17 | 65.2 |
| Copolymer (N-1-3) | 61 | 83 | 39 | 17 | 66.3 |
| Copolymer (N-1-4) | 67 | 84 | 33 | 16 | 53.6 |
| Copolymer (N-1-5) | 45 | 68 | 55 | 32 | 63.2 |
| Copolymer (N-1-6) | 28 | 50 | 72 | 50 | 72.2 |

Test Example 4

Contact Angle Measurement (2)

The procedure of Test Example 3 was repeated, except that a 1 mass % aqueous solution of each of the copolymers produced in Examples 1 to 5 and 7 to 17 was used. Contact angle was measured in the same manner.

Table 5 shows the results of Test Example 4.

TABLE 5

|  | Repeating unit (A) content | | Repeating unit (B) content | | |
|---|---|---|---|---|---|
|  | (mol %) | (mass %) | (mol %) | (mass %) | Contact angle (°) |
| Control | — | — | — | — | 83.2 |
| Copolymer (N-1-1) | 80 | 94 | 20 | 6 | 69.3 |
| Copolymer (N-1-2) | 62 | 83 | 38 | 17 | 64.9 |
| Copolymer (N-1-3) | 61 | 83 | 39 | 17 | 66.3 |
| Copolymer (N-1-4) | 67 | 84 | 33 | 16 | 53.2 |
| Copolymer (N-1-5) | 45 | 68 | 55 | 32 | 63.1 |
| Copolymer (N-1-7) | 65 | 83 | 35 | 17 | 50.4 |
| Copolymer (N-1-8) | 99 | 81 | 1 | 19 | 68.4 |
| Copolymer (N-1-9) | 99 | 81 | 1 | 19 | 70.5 |
| Copolymer (N-1-10) | 90 | 85 | 10 | 15 | 65.2 |
| Copolymer (N-1-11) | 82 | 85 | 18 | 15 | 60.1 |
| Copolymer (N-1-12) | 82 | 85 | 18 | 15 | 52.5 |
| Copolymer (N-1-13) | 80 | 85 | 20 | 15 | 49.8 |
| Copolymer (N-1-14) | 61 | 71 | 39 | 29 | 53.5 |
| Copolymer (N-1-15) | 73 | 85 | 27 | 15 | 53.2 |
| Copolymer (N-1-16) | 73 | 85 | 27 | 15 | 64.3 |
| Copolymer (N-1-17) | 99 | 99 | 1 | 1 | 67.9 |

As shown in Tables 4 and 5, copolymers (N-1-1) to (N-1-17) can hydrophilize the surface of a polystyrene substrate.

The invention claimed is:

1. A polymer, comprising a hydrophilic repeating unit represented by the following formula (2):

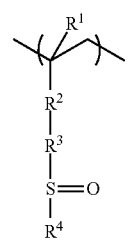

(2)

wherein:
R$^1$ represents a hydrogen atom or a methyl group;
R$^2$ represents —O—, *—(C=O)—O—, *—(C=O)—NR$^5$—, *—NR$^5$—(C=O)—, or a phenylene group;
R$^5$ represents a hydrogen atom or a C1 to C10 organic group;
* denotes the position of bonding to the carbon atom to which R$^1$ is bonded in formula (2);
R$^3$ represents a direct bond or a C1 to C24 divalent organic group; and
R$^4$ represents a C1 to C10 organic group, and
wherein at least one of R$^3$ and R$^4$ contain a hydroxy group.

2. The polymer according to claim 1, further comprising a hydrophobic repeating unit.

3. The polymer according to claim 2, wherein the hydrophobic repeating unit is derived from at least one monomer selected from the group consisting of a styrene, a (meth)acrylate, and a (meth)acrylamide.

4. The polymer according to claim 1, which is water-soluble.

5. The polymer according to claim 1, which has an HLB value of 10 to 22.

6. A surface-hydrophilizing agent, comprising a polymer comprising a hydrophilic repeating represented by the following formula (2):

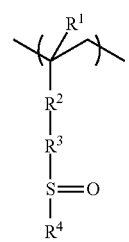

(2)

wherein:
R$^1$ represents a hydrogen atom or a methyl group;
R$^2$ represents —O—, *—(C=O)—O—, *—(C=O)—NR$^5$—, *—NR$^5$—(C=O)—, or a phenylene group;
R$^5$ represents a hydrogen atom or a C1 to C10 organic group;
* denotes the position of bonding to the carbon atom to which R$^1$ is bonded in formula (2);
R$^3$ represents a direct bond or a C1 to C24 divalent organic group; and
R$^4$ represents a C1 to C10 organic group, and wherein at least one of $R^3$ and $R^4$ contain a hydroxy group.

7. The surface-hydrophilizing agent according to claim 6, wherein the polymer further comprises a hydrophobic repeating unit.

8. The surface-hydrophilizing agent according to claim 7, wherein the hydrophobic repeating unit of the polymer is derived from at least one monomer selected from the group consisting of a styrene, a (meth)acrylate, and a (meth)acrylamide.

9. The surface-hydrophilizing agent according to claim 6, wherein the polymer is water-soluble.

10. The surface-hydrophilizing agent according to claim 6, wherein the polymer has an HLB value of 10 to 22.

11. A method for producing a substrate having a hydrophilic surface, the method comprising contacting a substrate with a surface-hydrophilizing agent comprising a hydrophilic repeating unit represented by the following formula (2):

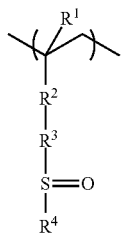

(2)

wherein:

$R^1$ represents a hydrogen atom or a methyl group;

$R^2$ represents —O—, *—(C=O)—O—, *—(C=O)—NR$^5$—, *—NR$^5$—(C=O)—, or a phenylene group;

$R^5$ represents a hydrogen atom or a C1 to C10 organic group;

* denotes the position of bonding to the carbon atom to which $R^1$ is bonded in formula (2);

$R^3$ represents a direct bond or a C1 to C24 divalent organic group; and $R^4$ represents a C1 to C10 organic group, and wherein at least one of $R^3$ and $R^4$ contain a hydroxy group.

12. The method for producing a substrate having a hydrophilic surface according to claim 11, wherein said contacting comprises the following (1) or (2):

(1) contacting the substrate with a solution comprising a solvent and the surface-hydrophilizing agent, and physically adsorbing the surface-hydrophilizing agent on the surface of the substrate in the solution, with the solvent remaining; or (2) contacting the substrate with a solution comprising a solvent and the surface-hydrophilizing agent, and evaporating the solvent through drying, to thereby form a dry film of the surface-hydrophilizing agent on the surface of the substrate.

* * * * *